US011771290B2

(12) United States Patent
Doughty et al.

(10) Patent No.: US 11,771,290 B2
(45) Date of Patent: Oct. 3, 2023

(54) SENSORS FOR AN AUTONOMOUS CLEANING ROBOT

(71) Applicant: iRobot Corporation, Bedford, MA (US)

(72) Inventors: Brian W. Doughty, Framingham, MA (US); Isaac Fowler, Cambridge, MA (US); Timothy James Haughton, Newton, MA (US); Levi Fox, Salem, MA (US)

(73) Assignee: iRobot Corporation, Bedford, MA (US)

( * ) Notice: Subject to any disclaimer, the term of this patent is extended or adjusted under 35 U.S.C. 154(b) by 1063 days.

(21) Appl. No.: 16/537,024

(22) Filed: Aug. 9, 2019

(65) Prior Publication Data

US 2020/0367715 A1    Nov. 26, 2020

Related U.S. Application Data

(60) Provisional application No. 62/850,177, filed on May 20, 2019.

(51) Int. Cl.
*A47L 11/00* (2006.01)
*A47L 11/40* (2006.01)

(52) U.S. Cl.
CPC ....... *A47L 11/4061* (2013.01); *A47L 11/4011* (2013.01); *A47L 2201/04* (2013.01); *A47L 2201/06* (2013.01); *G05D 2201/0203* (2013.01)

(58) Field of Classification Search
CPC ............. A47L 2201/04; A47L 2201/06; A47L 11/4061; A47L 11/4011; G05D 2201/0203; G05D 1/0227
See application file for complete search history.

(56) References Cited

U.S. PATENT DOCUMENTS

| 5,453,931 A | 9/1995 | Watts, Jr. |
| 7,765,635 B2 | 8/2010 | Park |

(Continued)

FOREIGN PATENT DOCUMENTS

| EP | 0522200 | 1/1993 |
| EP | 2835084 | 2/2015 |
| JP | H07 79890 | 3/1995 |
| WO | WO 2009/132317 | 10/2009 |

OTHER PUBLICATIONS

Screen capture (Figure. A) from YouTube video clip entitled "Cliff Sensing Technology | Roomba® | iRobot®", uploaded on Apr. 11, 2012 by user "iRobot". Retrieved from internet: <https://www.youtube.com/watch?v=FSd_MUUtLaY>. (Year: 2012).*

(Continued)

*Primary Examiner* — Geepy Pe
*Assistant Examiner* — Kimia Kohankhaki
(74) *Attorney, Agent, or Firm* — Fish & Richardson P.C.

(57) ABSTRACT

An autonomous cleaning robot includes a drive system to maneuver the autonomous cleaning robot across a floor surface; a cleaning assembly for cleaning the floor surface; and a sensor system disposed at a forward portion of the autonomous cleaning robot. The sensor system includes a movable element having (i) a first configuration in which the movable element extends beyond a bottom surface of the autonomous cleaning robot by a first amount, and (ii) a second configuration in which the movable element extends beyond the bottom surface of the autonomous cleaning robot by a second amount less than the first amount; a spring mechanically coupled to the movable element, the spring being biased to hold the movable element in the first configuration; and a sensor assembly configured to generate a signal based on the configuration of the movable element.

28 Claims, 16 Drawing Sheets

(56) References Cited

U.S. PATENT DOCUMENTS

| | | | | |
|---|---|---|---|---|
| 8,892,251 | B1* | 11/2014 | Dooley | A47L 11/4011 |
| | | | | 700/245 |
| 9,265,396 | B1* | 2/2016 | Lu | A47L 13/16 |
| 2004/0204792 | A1 | 10/2004 | Taylor et al. | |
| 2005/0010331 | A1* | 1/2005 | Taylor | G05D 1/0274 |
| | | | | 318/568.12 |
| 2006/0220606 | A1 | 10/2006 | Jeon | |
| 2006/0293794 | A1 | 12/2006 | Harwig et al. | |
| 2007/0016328 | A1* | 1/2007 | Ziegler | A47L 9/009 |
| | | | | 701/23 |
| 2007/0100500 | A1 | 5/2007 | Abramson et al. | |
| 2008/0134458 | A1 | 6/2008 | Ziegler et al. | |
| 2009/0038089 | A1 | 2/2009 | Landry et al. | |
| 2017/0181593 | A1 | 6/2017 | Ichikawa et al. | |
| 2018/0095472 | A1 | 4/2018 | Windorfer | |
| 2021/0228035 | A1* | 7/2021 | Klintemyr | A47L 9/0411 |

OTHER PUBLICATIONS

International Preliminary Report on Patentability in International Appln. No. PCT/US2020/028090, dated Dec. 2, 2021, 8 pages.
International Search Report and Written Opinion in International Appln. No. PCT/US2020/028090, dated Jul. 17, 2020, 10 pages.
U.S. Appl. No. 12/429,963, filed Apr. 24, 2009, Dooley et al.
U.S. Appl. No. 12/930,260, filed Dec. 30, 2010, Romanov.
"Braava Floor Mopping Robot: 300 Series Owner's Manual," iRobot Corp., Copyright 2008-2017, 28 pages.
"Braava Jet Owner's Guide," iRobot Corp., Copyright 2016-2017, 25 pages.
"Scooba 400 Series Owner's Manual," iRobot Corp., (undated), 32 pages.
Extended European Search Report in European Appln. No. 20808967. 2, dated Dec. 23, 2022, 8 pages.

* cited by examiner

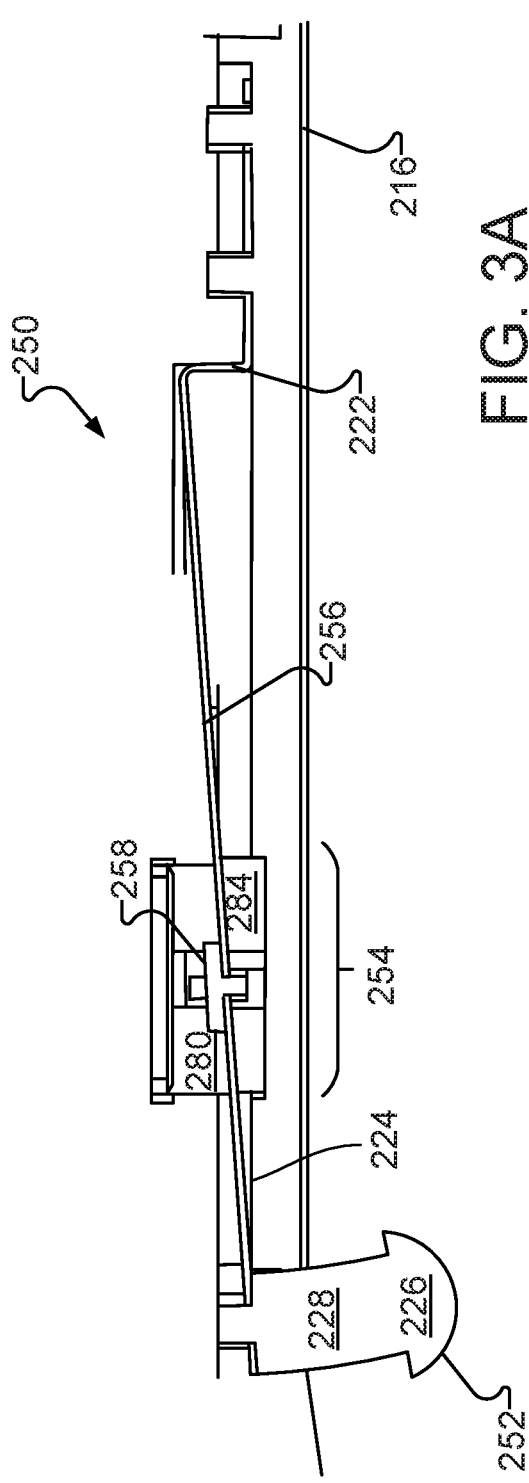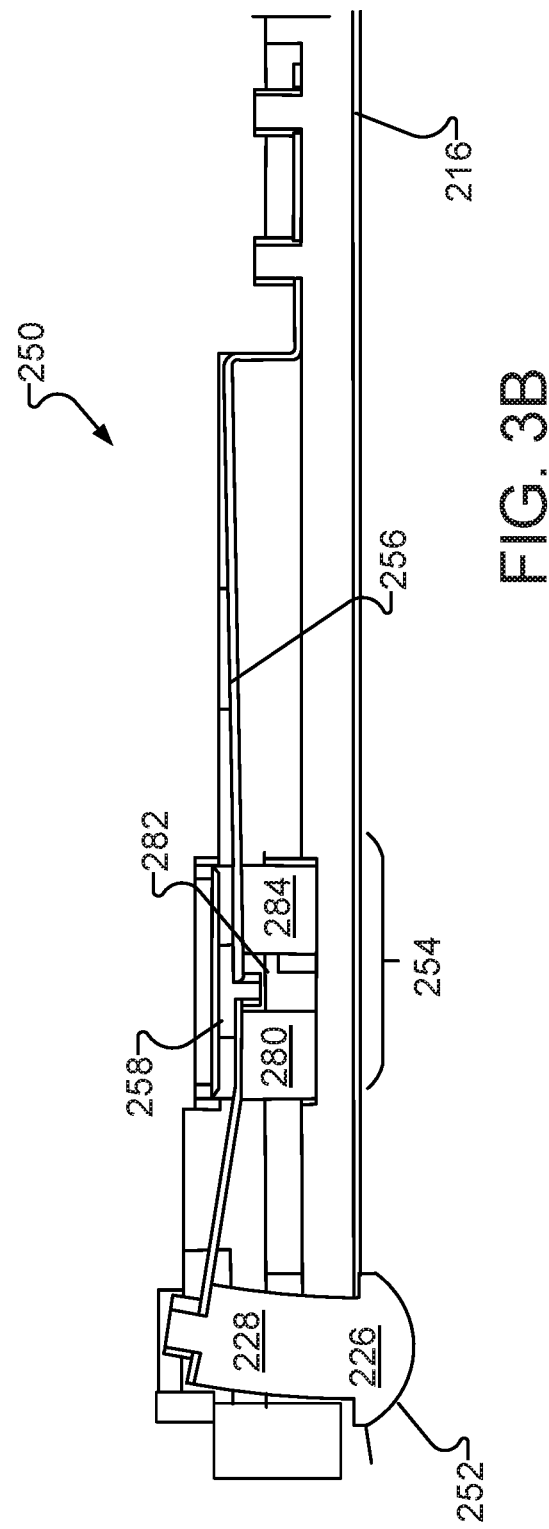

SENSORS FOR AN AUTONOMOUS CLEANING ROBOT

CLAIM OF PRIORITY

This application claims priority to U.S. Patent Application Ser. No. 62/850,177, filed on May 20, 2019, the contents of which are incorporated here by reference in their entirety.

BACKGROUND

Cleaning robots include mobile robots that autonomously perform cleaning tasks within an environment, e.g., a home. Many kinds of cleaning robots are autonomous to some degree and in different ways. The cleaning robots include a controller that is configured to autonomously navigate the cleaning robot about the environment such that the cleaning robot can ingest debris as it moves.

SUMMARY

Autonomous cleaning robots navigate around floor surfaces to clean the floor surfaces, e.g., by wet mopping or dry cleaning. To prevent an autonomous cleaning robot from navigating over a flooring drop, e.g., from falling down a flight of stairs, autonomous cleaning robots can be equipped with cliff sensors. Cliff sensors detect the presence of a flooring height change such that operation of the autonomous cleaning robot can be halted before the autonomous cleaning robot navigates over the flooring height change.

Certain autonomous cleaning robots can use cliff sensors that include a weighted element. The weighted element can be held in place by flooring beneath the autonomous cleaning robot, and in the absence of flooring beneath the autonomous cleaning robot, gravity can cause the weighted element to fall and extend beyond a bottom plane of the autonomous cleaning robot. The autonomous cleaning robot can then execute a cliff avoidance behavior in response to the extension of the weighted element. In autonomous cleaning robots having a cleaning pad, the cleaning pad may sometimes prevent or reduce the extension of the weighted element, and thus may reduce the effectiveness of cliff sensors using a weighted element.

The inventors have recognized, among other things, that an elastic element can be used in a cliff sensor to provide for deflection of the cleaning pad when the autonomous cleaning robot encounters a flooring height change.

The cliff sensors described here include a movable element that takes on a retracted configuration when the autonomous cleaning robot is on a substantially flat floor surface and an extended configuration when the autonomous cleaning robot is at a flooring height change. A sensor, such as an optical sensor or a piezoelectric sensor, detects when the movable element is in the extended configuration and sends a signal that causes navigation of the autonomous cleaning robot to be halted.

In an aspect, an autonomous cleaning robot includes a drive system to maneuver the autonomous cleaning robot across a floor surface; a cleaning assembly for cleaning the floor surface; and a sensor system disposed at a forward portion of the autonomous cleaning robot. The sensor system includes a movable element having (i) a first configuration in which the movable element extends beyond a bottom surface of the autonomous cleaning robot by a first amount, and (ii) a second configuration in which the movable element extends beyond the bottom surface of the autonomous cleaning robot by a second amount less than the first amount; a spring mechanically coupled to the movable element, the spring being biased to hold the movable element in the first configuration; and a sensor assembly configured to generate a signal based on the configuration of the movable element.

Embodiments can include one or more of the following features.

The movable element is configured to be in the first configuration when the autonomous cleaning robot is disposed on a flat floor surface.

The movable element is configured to be in the second configuration when the forward portion of the autonomous cleaning robot is at a flooring drop.

The sensor assembly is configured to generate a signal when the movable element is in the second configuration.

The sensor assembly includes an optical gate sensor assembly. The optical gate sensor assembly includes a light source; a light detector positioned to receive light from the light source; and a gate element mechanically coupled to the movable element of the sensor system, the gate element being movable into a path between the light source and the light detector. When the movable element is in the second configuration, the gate element is positioned in the path between the light source and the light detector.

The sensor assembly includes a piezoelectric sensor assembly.

The movable element includes a plunger configured to move between the first configuration and the second configuration in a direction perpendicular to the bottom surface of the autonomous cleaning robot.

The movable element includes a lever configured to pivot between the first configuration to the second configuration.

The movable element includes a flap connected to the bottom surface of the autonomous cleaning robot by a hinge.

The spring includes a leaf spring.

The spring includes an extension spring.

The spring includes a torsion spring.

The autonomous cleaning robot includes multiple springs connected in series, the multiple springs being mechanically coupled to the movable element.

The autonomous cleaning robot includes a control unit configured to control operation of the autonomous cleaning robot. The control unit is configured to receive the signal from the sensor and to stop operation of the autonomous cleaning robot responsive to receive of the signal.

The movable element is configured to move from the first configuration to the second configuration responsive to a change in the floor surface in a vicinity of the movable element.

The cleaning assembly includes a cleaning pad holder.

In an aspect, a method includes controlling an autonomous cleaning robot to execute a cleaning mission; detecting a change in a configuration of a sensor assembly system disposed at a forward portion of the autonomous cleaning robot, including: generating a signal generated based on a configuration of a movable element coupled to a spring, the movable element having (i) a first configuration in which the movable element extends beyond a bottom surface of the robot body by a first amount, and (ii) a second configuration in which the movable element extends beyond the bottom surface of the robot body by a second amount less than the first amount, the spring being biased to hold the movable element in the first configuration; and stopping execution of the cleaning mission by the autonomous cleaning robot responsive to detecting the change in configuration of the sensor system.

Embodiments can include one or more of the following features.

Detecting a change in a configuration of a sensor system includes detecting that the movable element is in the second configuration.

The movable element is configured to be in the first configuration when the autonomous cleaning robot is disposed on a flat floor surface.

The movable element is configured to be in the second configuration when the forward portion of the autonomous cleaning robot is at a flooring drop.

Generating a signal based on the configuration of the movable element includes generating the signal when the movable element is in the second configuration.

Generating a signal based on the configuration of the movable element includes detecting when a gate element mechanically coupled to the movable element of the sensor system is positioned in a path between a light source of an optical gate sensor assembly and a light detector of the optical gate sensor assembly.

Generating a signal based on the configuration of the movable element includes generating a signal based on a change in a configuration of a plunger configured to move between the first configuration and the second configuration in a direction perpendicular to the bottom surface of the autonomous cleaning robot.

Generating a signal based on the configuration of the movable element includes generating a signal based on a change in a configuration of a lever configured to pivot between the first configuration and the second configuration.

Generating a signal based on the configuration of the movable element includes generating a signal based on a change in a configuration of a flap connected to the bottom surface of the autonomous cleaning robot by a hinge The details of one or more implementations are set forth in the accompanying drawings and the description below. Other features and advantages will be apparent from the description and drawings, and from the claims.

BRIEF DESCRIPTION OF DRAWINGS

FIGS. 3A and 3B are diagrams of a sensor for an autonomous cleaning robot.

DETAILED DESCRIPTION

Described herein are cliff sensors for autonomous cleaning robots. Cliff sensors detect flooring height changes, such as the presence of a stair, to prevent an autonomous cleaning robot from navigating over a flooring height change. The cliff sensors described herein include a movable element that takes on a retracted configuration when the autonomous cleaning robot is on a substantially flat floor surface. When the autonomous cleaning robot navigates to a flooring drop, an actuator, such as a spring, pushes the movable element into an extended configuration. A sensor, such as an optical gate sensor or a piezoelectric sensor, detects when the movable element is in its extended configuration so that operation of the autonomous cleaning robot can be halted before the autonomous cleaning robot navigates over the flooring drop.

Figure 1A:
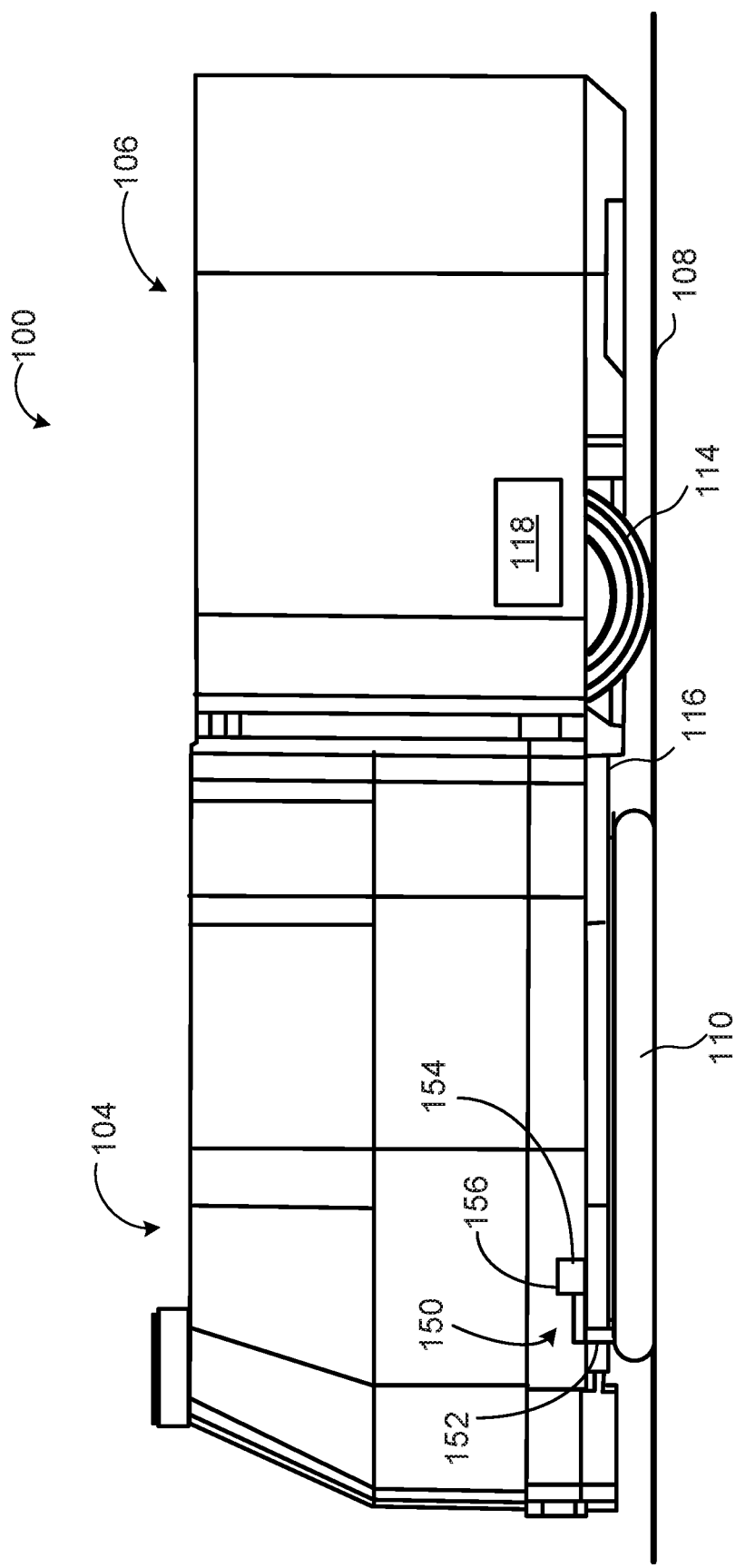
FIGS. 1A and 1B are side views of an autonomous cleaning robot.
Figure 1B:
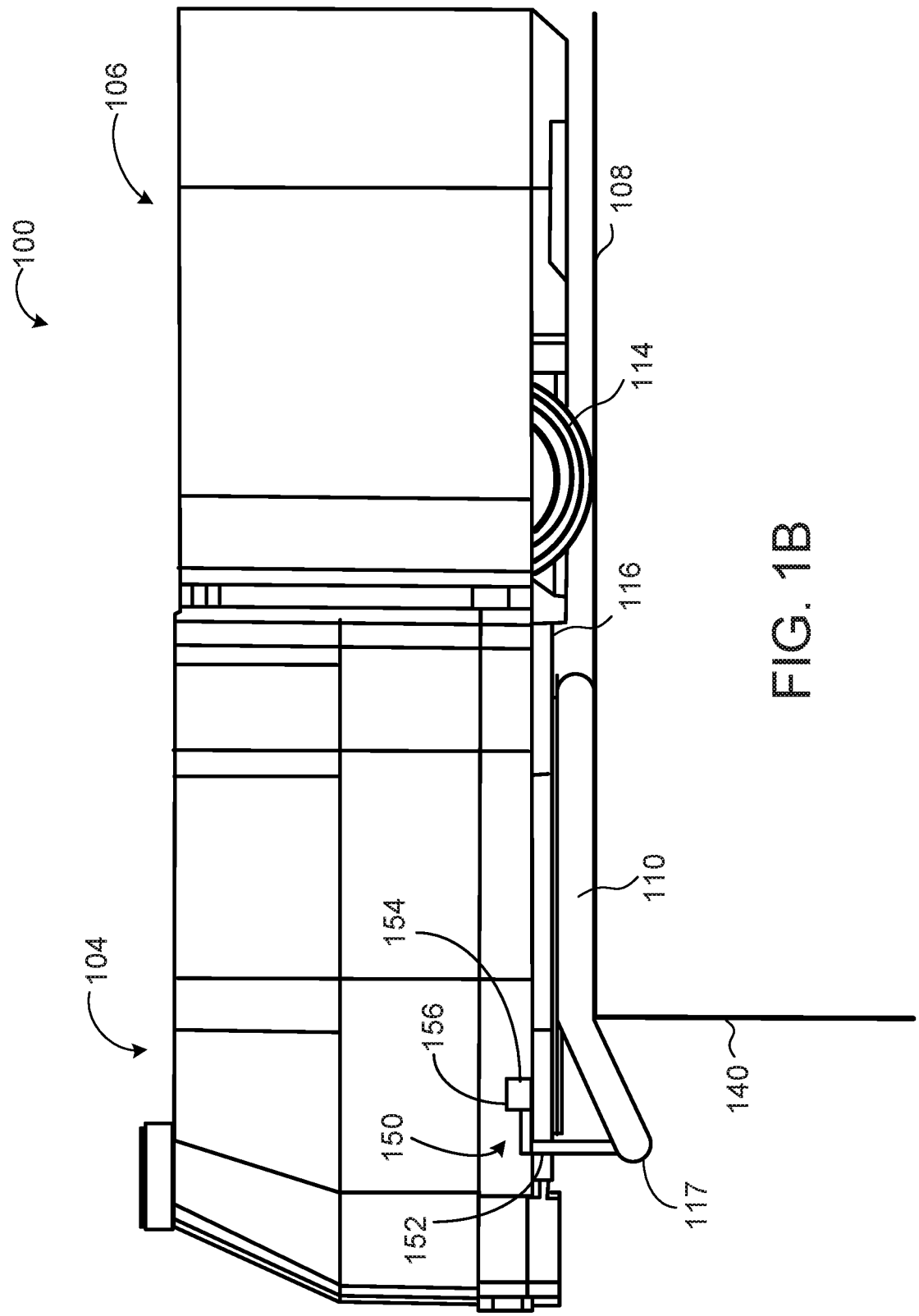

Referring to FIGS. 1A and 1B, a cleaning pad 110 is attached to an example autonomous cleaning robot 100. A drive system maneuvers the autonomous cleaning robot 100 across a floor surface 108. Wheels 114 support a rear portion 106 of the autonomous cleaning robot 100, and the cleaning pad 110 supports a forward portion 104 of the autonomous cleaning robot 100. As the autonomous cleaning robot 100 navigates the floor surface 108, the cleaning pad 110 contacts the floor surface 108, providing cleaning functionality, such as wet mopping or dry cleaning functionality. The cleaning pad 110 is reversibly attached to a pad holder of the autonomous cleaning robot 100, e.g., such that the cleaning pad 110 can be replaced after the autonomous cleaning robot 100 completes execution of a cleaning mission or when the cleaning pad 110 becomes soiled. The cleaning pad 110 can be a disposable cleaning pad or a reusable cleaning pad.

The autonomous cleaning robot 100 includes a forward cliff sensor 150 disposed in each forward corner of the autonomous cleaning robot 100. The cliff sensors 150 detect flooring height changes beyond a threshold accommodated by reversible robot wheel drop prior to traversal of the respective floor portions by the autonomous cleaning robot 100. When a flooring height change is detected by a cliff sensor 150, operation of the autonomous cleaning robot 100 is halted. For example, the placement of the cliff sensors 150 proximate the forward corners of the autonomous cleaning robot 100 helps to ensure that the cliff sensors 150 trigger when the autonomous cleaning robot 100 overhangs a flooring drop 140 (FIG. 1B), preventing the wheels 114 from advancing over the edge of the drop.

In some examples, an autonomous cleaning robot can include only a single forward cliff sensor, or can include multiple forward cliff sensors. In some examples, an autonomous cleaning robot can include one or more rear cliff sensors disposed in the rear portion 106 of the autonomous cleaning robot 100, e.g., in one or more of the rear corners.

Each cliff sensor 150 includes a movable element 152 that takes on a retracted configuration when the autonomous cleaning robot 100 is on a substantially flat floor surface 108 (FIG. 1A) and an extended configuration when the autonomous cleaning robot 100 navigates to a flooring drop 140 (FIG. 1B). In the extended configuration, the movable element extends beyond a bottom surface 116 of the autonomous cleaning robot 100. In the retracted configuration, the movable element 152 extends beyond the bottom surface 116 of the autonomous cleaning robot 100 by a lesser amount. For instance, in the retracted configuration, the movable element 152 can extend by a small amount beyond the bottom surface 116 of the autonomous cleaning robot, e.g., less than 10 mm, 8 mm, 5 mm, 3 mm, or another small amount, or can be flush with the bottom surface 116 of the autonomous cleaning robot.

The movable element 152 is mechanically coupled to an actuator 156, such as a spring. The actuator 156 presses the movable element 152 against the cleaning pad 110 with a certain amount of force, e.g., a force that is based on a spring constant of the spring or a combination of a spring force and a gravity force. In operation, when the autonomous cleaning robot 100 is on a substantially flat floor surface 108 (FIG. 1A), the floor surface 108 and the cleaning pad 110 exert an opposite force against the movable element 152 that is sufficient to overcome force of the actuator 156. As a result, the movable element 152 is pushed into its retracted configuration. When the forward portion 104 of the autonomous cleaning robot 100 navigates to a flooring drop 140, such as a stair, the force from the floor surface no longer acts on the movable element 152, and the actuator 156 pushes the movable element 152 away from the bottom surface 116 of the autonomous cleaning robot 100 and into its extended position. When the movable element 152 is in its extended position, the movable element 152 deflects a front portion 117 of the cleaning pad 110 away from the bottom surface 116 of the autonomous cleaning robot. The actuator 156 applies sufficient force on the movable element 152 to enable the movable element 152 to deflect the cleaning pad 110.

A sensor assembly 154 in each cliff sensor 150 detects the configuration of the movable element 152 and generates a signal based on the detected configuration. The signal is provided to a controller 118 of the autonomous cleaning robot. The sensor assembly 154 can detect when the movable element 152 is in the retracted configuration, when the movable element 152 is in the extended configuration, or both, or can detect a change in the configuration of the movable element 152. When the movable element 152 of any of the cliff sensors 150 is in the extended configuration, the controller 118 halts operation of the autonomous cleaning robot 100 to prevent the autonomous cleaning robot from navigating over the flooring drop 140. For instance, the sensor assembly 154 can send a signal to the controller 118 when the sensor assembly 154 detects that the movable element 152 is in its extended configuration.

The cliff sensor 150 can be designed to accommodate a threshold amount of variation in floor topography before triggering the controller 118 to halt operation of the autonomous cleaning robot 100. For instance, the sensor assembly 154 can be configured or calibrated such that the movable element 152 can move by a threshold amount before the sensor assembly 154 detects that the movable element 152 is in its extended configuration. The threshold amount can be, e.g., between 1 and 10 mm, e.g., 2 mm, 3 mm, 4 mm, 5 mm, 6 mm, 8 mm, or 10 mm. When the movable element 152 is extended beyond the threshold amount, the sensor assembly detects that the movable element 152 is in its extended configuration and sends a signal to the controller 118. The accommodation of a threshold amount of movement of the movable element 152 before triggering detection of the extended configuration is referred to as overtravel.

The movable element 152 can be, for instance, a plunger, a peg, a lever, a door, a ball, or another suitable movable element. The actuator 156 can be, for instance, a leaf spring, a coiled spring, a torsion spring, or another suitable actuator, or a combination of multiple actuators, such as multiple springs arranged in series. The sensor assembly 154 can be based on, for instance, an optical sensor such as an optical gate, a piezoelectric sensor, a Hall effect sensor, an analog Hall effect sensor, a magnetic sensor, a mechanical contact switch, or another suitable sensor.

Figure 2:
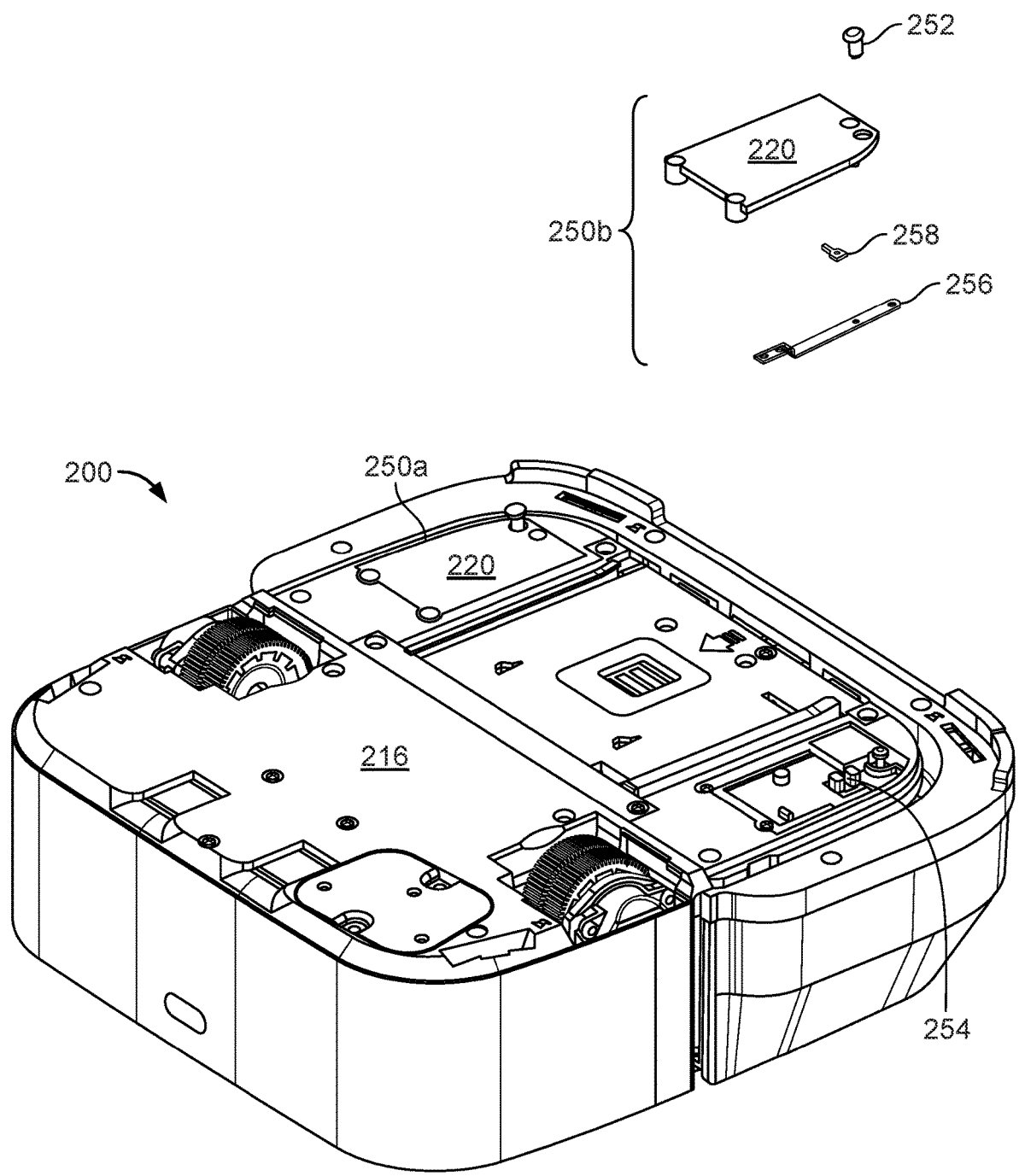
FIG. 2 is a bottom perspective view of an autonomous cleaning robot.

Referring to FIG. 2, a leaf spring cliff sensor 250 is disposed at each forward corner of an example autonomous cleaning robot 200. In the example of FIG. 2, a first cliff sensor 250a is shown assembled, and a second cliff sensor 250b is shown in an exploded view. Each cliff sensor 250 includes a plunger 252 that is configured to move in a direction substantially perpendicular to a bottom surface 216 of the autonomous cleaning robot 200 to take on either a retracted configuration or an extended configuration. The plunger 252 is mechanically coupled to a leaf spring 256 that exerts a force that presses the plunger 252 against a cleaning pad (not shown) of the autonomous cleaning robot 200. An optical gate sensor assembly 254, including a gate element 258, is configured to detect the configuration of the plunger 252.

The leaf spring 256 and the optical gate sensor assembly 254 are enclosed within an interior space in the autonomous cleaning robot 200 by a panel 220. The enclosure can prevent stray light from interfering with the operation of the optical gate sensor assembly 254. In some examples, the enclosure can also prevent contamination of the sensor assembly 254 and can protect the leaf spring and sensor assembly 254 from damage, e.g., by debris or rough flooring surfaces. In some examples, the panel 220 can have a watertight seal to prevent fluid from contacting the leaf spring 256 or the sensor assembly 254.

FIG. 3A shows the leaf spring cliff sensor 250 with the plunger 252 in its extended configuration, e.g., the configuration of the cliff sensor 250 when the autonomous cleaning robot is at a flooring drop. A first end 222 of the leaf spring 256 is mounted to the autonomous cleaning robot. The plunger 252 is mounted on a second end 224 of the leaf spring 256. In the extended configuration, a head 226 and a portion of a shaft 228 of the plunger 252 extend beyond the bottom surface 216 of the autonomous cleaning robot. In some examples, in the extended configuration, the leaf spring 256 is relaxed.

In some examples, the leaf spring 256 is preloaded to have a certain amount of tension in the extended configuration, e.g., to enable a desired amount of overtravel to be achieved. For instance, the leaf spring 256 can be preloaded by a percentage of the weight of the autonomous cleaning robot that is applied to the cleaning pad, such as between 10% and 50% of the robot weight applied to the cleaning pad, e.g., between 10% and 25%, between 15% and 30%, between 20% and 35%, between 25% and 40%, between 30% and 45%, between 35% and 50%. In some examples, the robot weight can be in a range from 2000 g to 4000 g, 10% to 20% of the robot weight can be applied to the cleaning pad, and the leaf spring 256 can be preloaded by 1% to 10% of the robot weight. In an example where there a number of leaf springs 256, each of the leaf springs can be preloaded by 1% to 10% of the robot weight. The amount of tension to which the leaf spring is preloaded can balance the ability of the cliff sensor 250 to detect a flooring drop with an appropriate level of tolerance for variations in floor topography. For instance, the amount of tension can be selected such that the cliff sensor does not reach its extended configuration when the autonomous cleaning robot navigates over a floor topography variation, such as a threshold or a grout line.

The optical gate sensor assembly 254 is positioned along the length of the leaf spring 256, and the gate element 258 is disposed on the leaf spring 256. When the plunger 252 is in its extended configuration, the gate element 258 is positioned centrally within the optical gate sensor assembly 254.

Referring to FIG. 3B, when the autonomous cleaning robot is on a substantially flat flooring surface, the floor surface and cleaning pad apply force to the plunger 252 that acts against the force applied by the leaf spring 256. This force pushes the leaf spring 256 into a tensioned, bent configuration and pushes the plunger 252 into its retracted configuration. The shaft 228 of the plunger 252 is retracted into an interior space of the autonomous cleaning robot. In the example of FIG. 3B, the head 226 remains extended beyond the bottom surface 216 of the autonomous cleaning robot. In some examples, the head 226 can become flush with the bottom surface 216 of the autonomous cleaning robot. The bending of the leaf spring 256 pushes the gate element 258 toward a top of the optical gate sensor assembly 254.

Figure 4A:
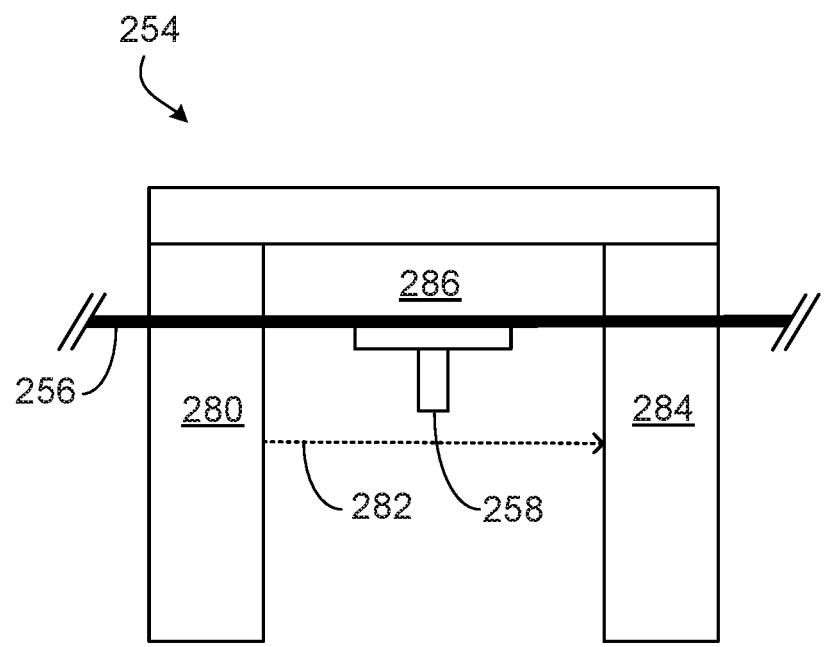
FIGS. 4A and 4B are diagrams of an optical gate sensor assembly.
Figure 4B:
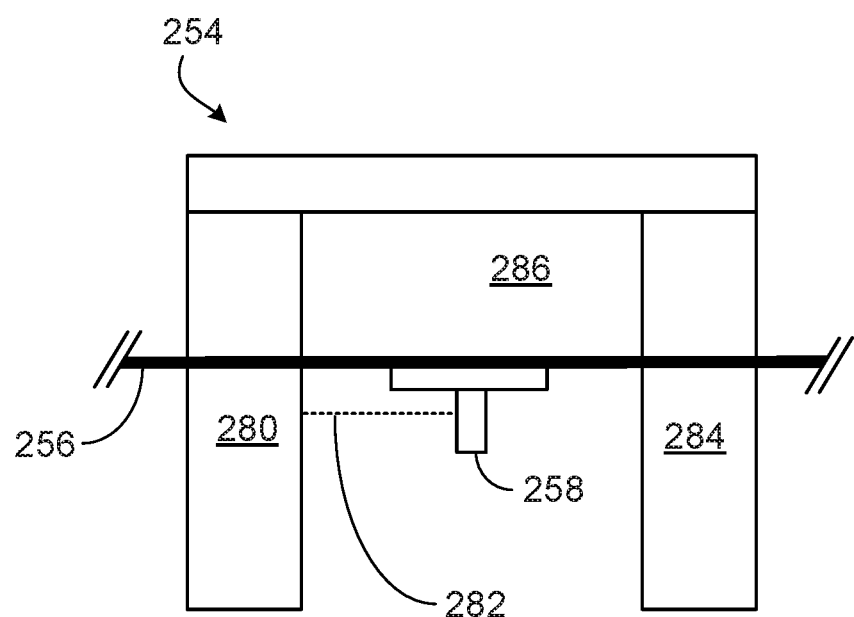

Referring also to FIGS. 4A and 4B, the optical gate sensor assembly 254 includes a light source 280, such as a laser, laser diode, or light emitting diode (LED), that generates a light beam 282. A light detector 284, such as a photodiode, is positioned to receive the light beam 282. The gate element 258 is disposed in a space 286 between the light source 280 and the light detector 284.

When the plunger is in its retracted configuration (FIG. 4A), the leaf spring 256 is shaped such that the gate element 258 is positioned toward the top of the space 286, out of the path of the light beam 282. Thus, when the plunger is in its retracted configuration (e.g., when the autonomous cleaning robot is on a substantially flat floor surface), the light detector 284 receives the light beam 282 from the light source 280. When the plunger is in its extended configuration (FIG. 4B), the gate element 258 is positioned centrally within the space 286, in the path of the light beam 282. Thus, when the plunger is in its extended configuration (e.g., when the autonomous cleaning robot is at a flooring drop), the light detector 284 does not receive light from the light source 280.

The optical gate sensor assembly 254 generates a signal based on the configuration of the plunger. For instance, the signal generated by the light detector 284 is different depending on whether the light detector 284 is or is not receiving light from the light source 280. The signal is provided to a controller of the autonomous cleaning robot, which can control operation of the autonomous cleaning robot based on the signal. For instance, if the signal from the optical gate sensor assembly 254 indicates that the light detector 284 is not receiving light from the light source 280, the controller can stop navigation of the autonomous cleaning robot. In some examples, the optical gate sensor assembly 254 operates with a fail-safe mechanism, such that whenever the light detector 284 does not detect a light signal (whether due to movement of the plunger or due to a failure of the light source 280 or the light detector 284), the controller can stop navigation.

Figure 5:
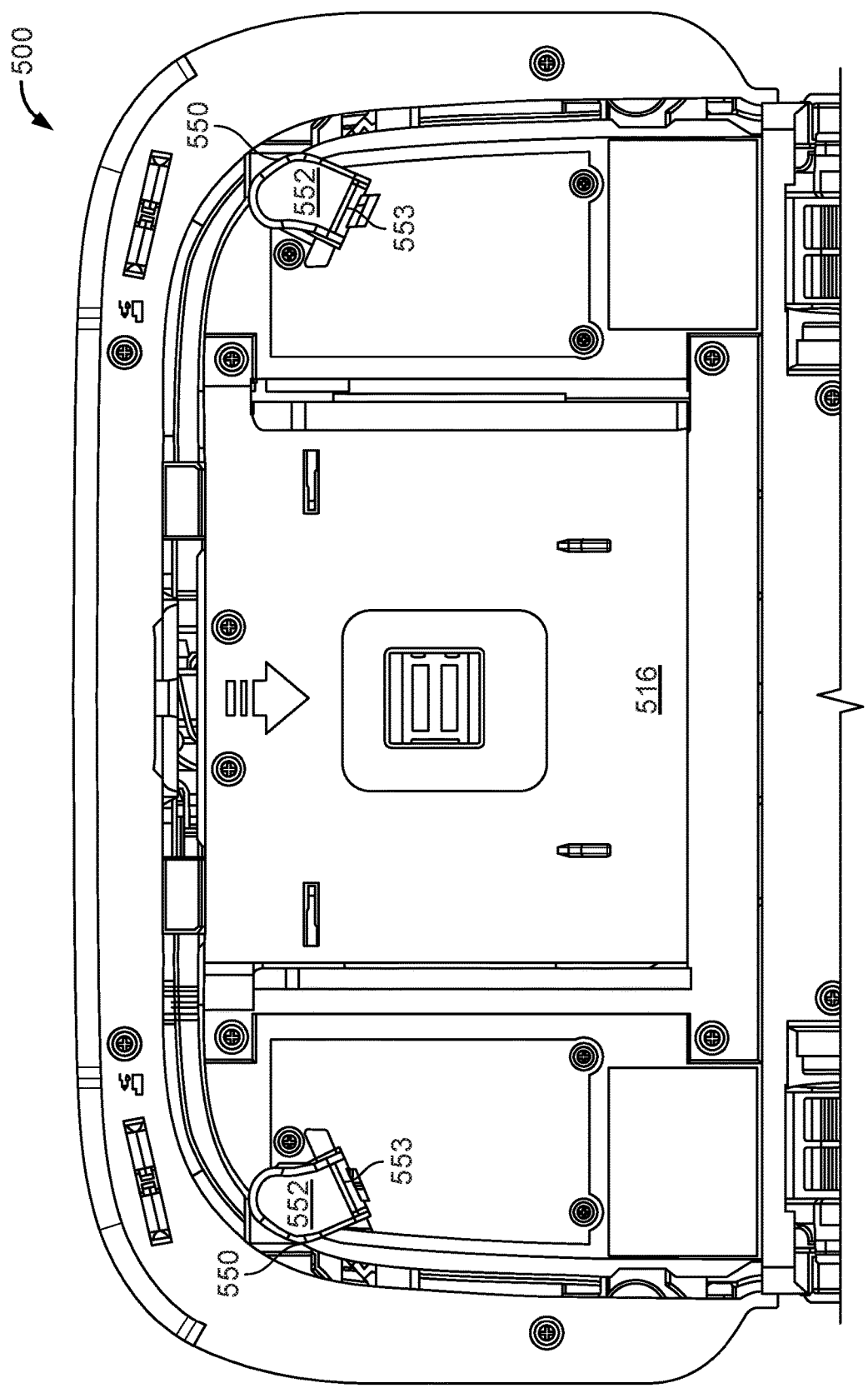
FIG. 5 is a bottom view of a forward portion of an autonomous cleaning robot.
Figure 6A:
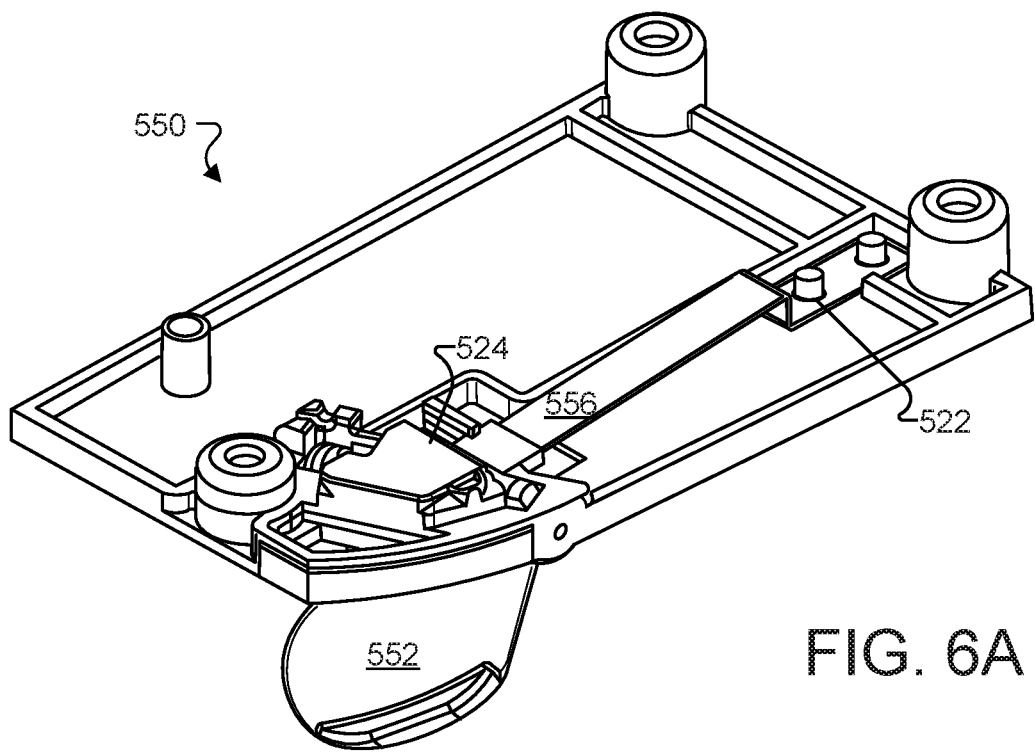
FIGS. 6A and 6B are diagrams of a sensor for an autonomous cleaning robot.
Figure 6B:
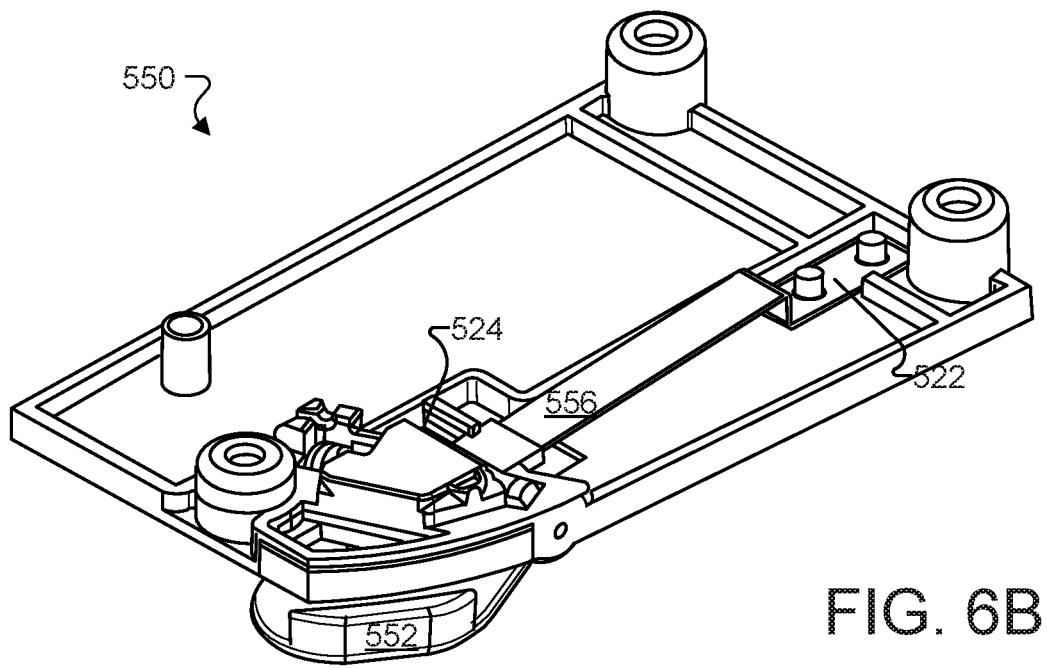

Referring to FIG. 5, a leaf spring cliff sensor 550 is disposed at each forward corner of an example autonomous cleaning robot 500. Referring also to FIGS. 6A and 6B, each cliff sensor 550 includes a flap 552 that is configured to pivot about a hinge 553 between an extended configuration (FIG. 6A) and a retracted configuration (FIG. 6B). The flap 552 is mechanically coupled to a torsion spring (not shown) that exerts a force that presses the flap 552 open against a cleaning pad (not shown) of the autonomous cleaning robot. A leaf spring 556 is positioned to be deflected by movement of the flap 552, and acts to move a gate element 558 (FIG. 7) of an optical gate sensor assembly responsive to movement of the flap 552. A first end 522 of the leaf spring 556 is mounted to the autonomous cleaning robot. A second end 524 of the leaf spring 556 is in contact with the flap 552. In some examples, another suitable mechanism other than a leaf spring can be used to move the gate element 558 responsive to movement of the flap 552.

Figure 7:
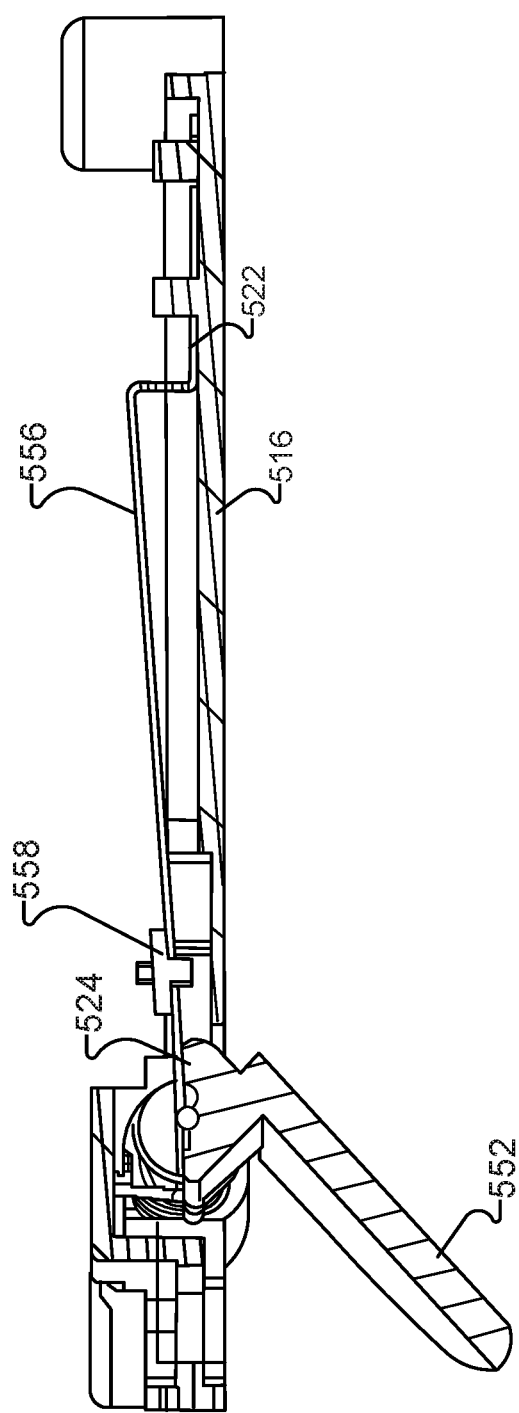
FIG. 7 is a diagram of a sensor for an autonomous cleaning robot.

Referring also to FIG. 7, in its extended configuration, the flap 552 is opened relative to a bottom surface 516 of the autonomous cleaning robot, such that the flap 552 extends beyond the bottom surface 516. In some examples, in the extended configuration, the leaf spring 556 is relaxed. In some examples, the leaf spring 556 is preloaded to have a certain amount of tension in the extended configuration.

A gate element 558 of an optical gate sensor assembly (not shown) is positioned along the length of the leaf spring 556. Similar to the operation of the optical gate sensor assembly 254 discussed for FIGS. 4A and 4B, when the flap 552 is in its extended configuration, the gate element 558 is disposed in the light path of the optical gate sensor assembly.

Referring specifically to FIG. 6B, when the autonomous cleaning robot is on a substantially flat floor surface, the floor surface and cleaning pad apply a force to the flap 552 that acts against the force applied to the flap 552 by the torsion. This force pushes the flap 552 into its retracted configuration, in which the flap 552 is closed relative to the bottom surface 516 of the autonomous cleaning robot, e.g., more closed than it is in the extended configuration. The closed flap 552 in its retracted configuration extends beyond the bottom surface 516 of the autonomous cleaning robot by a lesser amount than in the extended configuration, e.g., the flap 552 can be flush with the bottom surface 516.

The closing of the flap causes leaf spring 556 to bend, which in turn pushes the gate element 558 toward a top of the optical gate sensor assembly, allowing the light detector to receive light from the light source of the optical gate sensor assembly.

The incorporation of the flap 552 into the leaf spring cliff sensor 550 can provide for a greater amount of overtravel, enabling the autonomous cleaning robot to navigate over floor topography variations without the flap 552 moving into its extended configuration. The use of the flap 552 can also enable the leaf spring cliff sensor 550 to be mounted aligned with areas of the cleaning pad that are relatively easily deflected, e.g., the corners of the cleaning pad, which can enhance the sensitivity of the leaf spring cliff sensor 550.

Figure 8:
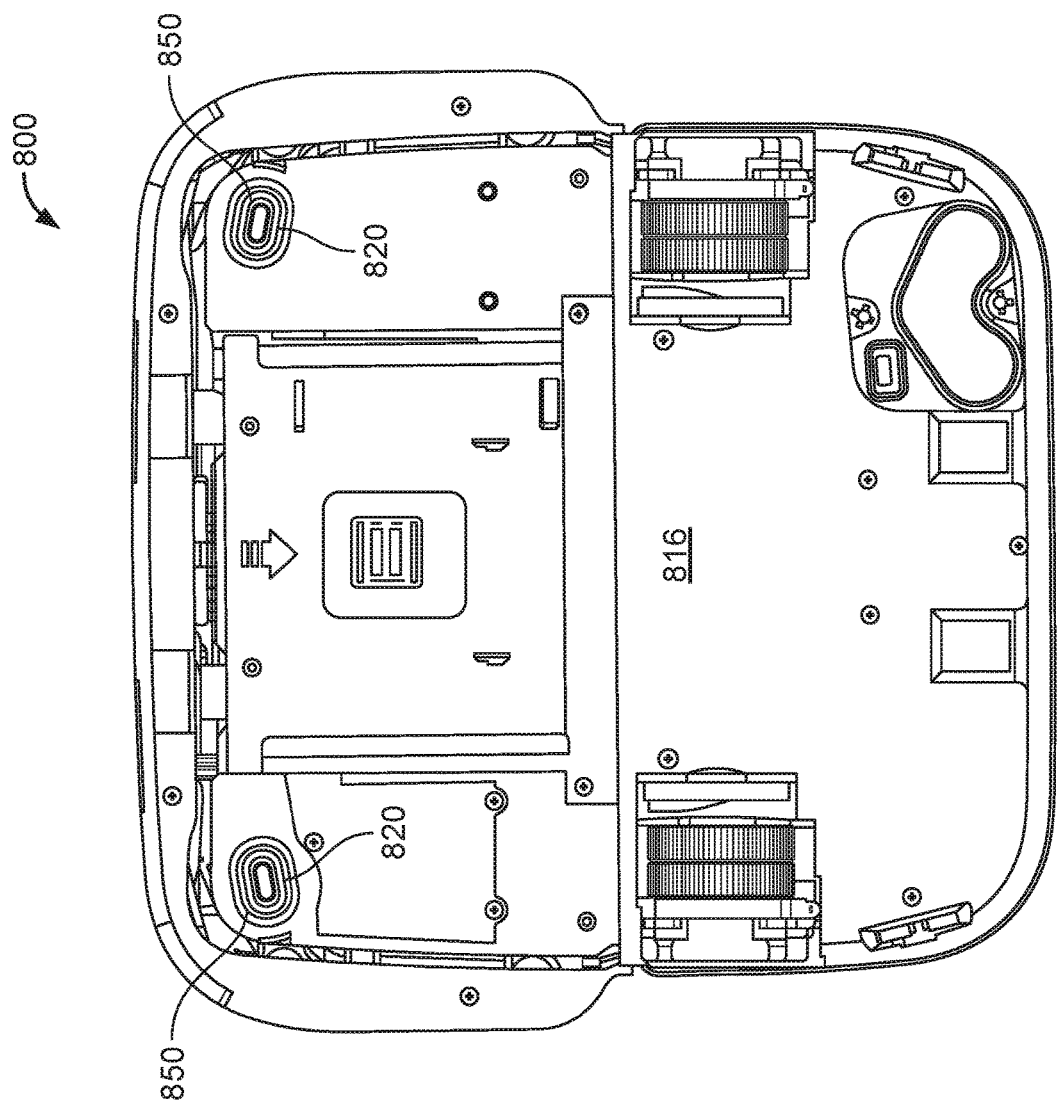
FIG. 8 is a bottom view of an autonomous cleaning robot.

In some examples, the leaf spring 556 can be preloaded by a percentage of the weight of the autonomous cleaning robot that is applied to the cleaning pad, such as between 10% and 50% of the robot weight that applied to the cleaning pad or between 1% and 10% of the robot weight, as discussed above with respect to FIG. 3A. Referring to FIG. 8, a spring lever cliff sensor 850 is disposed at each forward corner of an example autonomous cleaning robot 800. Each cliff sensor 850 includes a lever mechanically coupled to an extension spring (discussed in FIG. 9), with an optical gate sensor assembly to detect a configuration of the lever. The lever, extension spring, and optical gate sensor assembly are enclosed within an interior space in the autonomous cleaning robot 800 by a flexible seal 820, such as a rubber seal. The flexible seal 820 can prevent contamination of the cliff sensor 850 and can protect the elements of the cliff sensor 850 from damage, e.g., by debris or rough floor surfaces. In some examples, the flexible seal 820 can prevent stray light from interfering with the operation of the optical gate sensor assembly of the cliff sensor 850. In some examples, the seal 820 can be a watertight seal to prevent fluid from contacting the cliff sensor 850.

Figure 9:
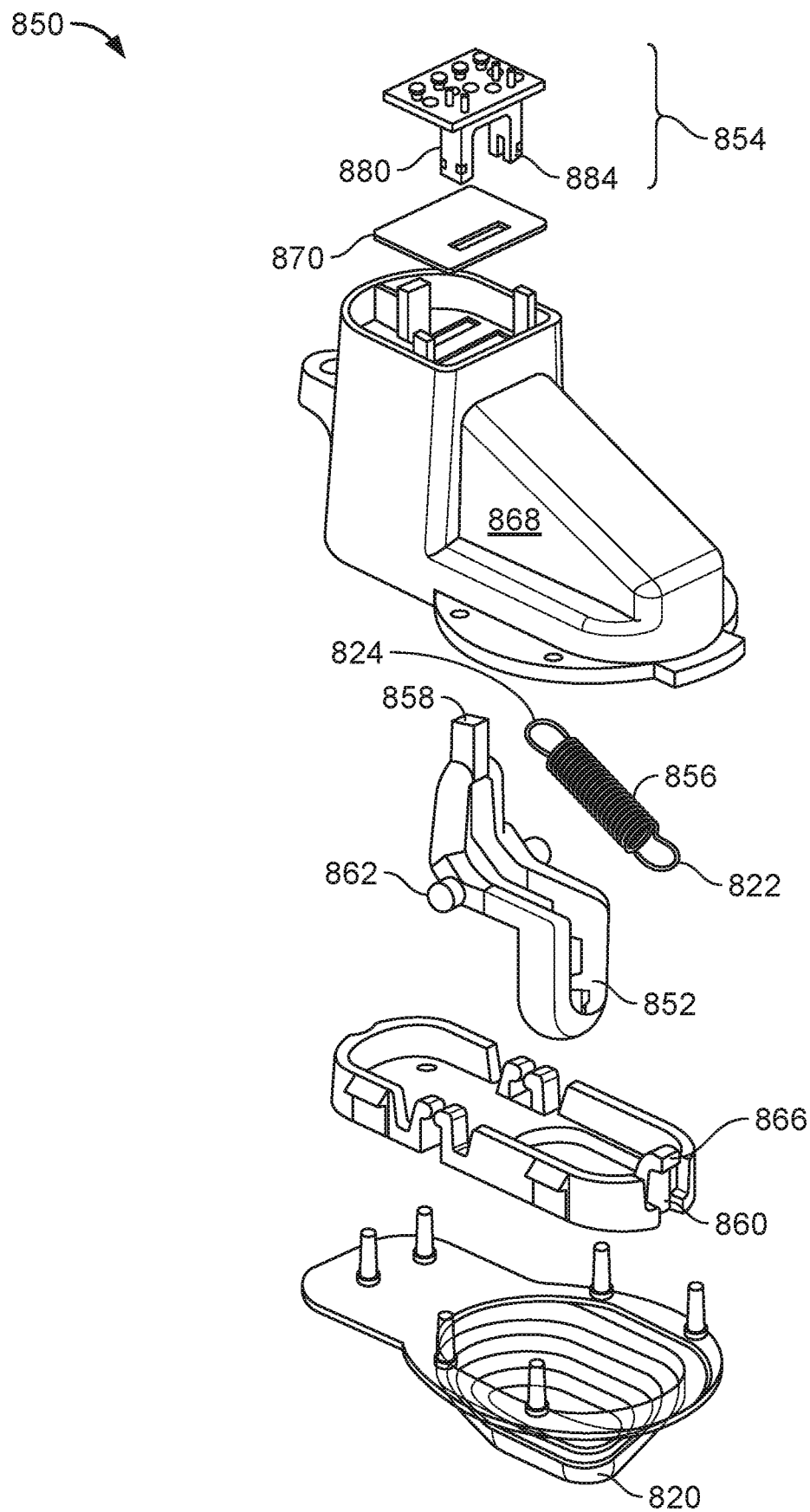
FIG. 9 is an exploded view of a sensor for an autonomous cleaning robot.

FIG. 9 shows an exploded view of the spring lever cliff sensor 850. A lever 852 is mounted on a lever mount 860 such that the lever 852 can pivot about lever protrusions 862 nested in the lever mount 860. The pivoting of the lever 852 moves the lever 852 between an extended configuration and a retracted configuration. An extension spring 856 is mechanically coupled to the lever 852. A first end 822 of the extension spring 856 is mounted on a hook 866 on the lever mount 860, and a second end 824 of the extension spring 856 is mounted on a gate element 858 disposed at a top of the lever 852. The lever 852, lever mount 860, and extension spring 856 are disposed in a space defined between a housing 868 and the flexible pad 820.

An optical gate sensor assembly 854 is disposed at a top of the housing 868. The optical gate sensor assembly 854 includes a light source 880 and a light detector 884 that is positioned to receive a light beam from the light source 880. The optical gate sensor assembly 854 operates as described for the optical gate sensor assembly 254 of FIGS. 4A and 4B. The optical gate sensor assembly 854 is isolated from the interior of the housing 868 by a seal 870, such as a foam seal, to prevent contamination and to isolate the optical gate sensor assembly 854 from stray light. For instance, the foam seal 870 can contain an encapsulation material that encapsulates components of the optical gate sensor assembly 854, e.g., an encapsulation material formed of an epoxy.

In some examples, the extension spring 856 can be preloaded by a percentage of the weight of the autonomous cleaning robot that is applied to the cleaning pad, such as between 10% and 50% of the robot weight that applied to the cleaning pad or between 1% and 10% of the robot weight, as discussed above with respect to FIG. 3A.

Figure 10A:
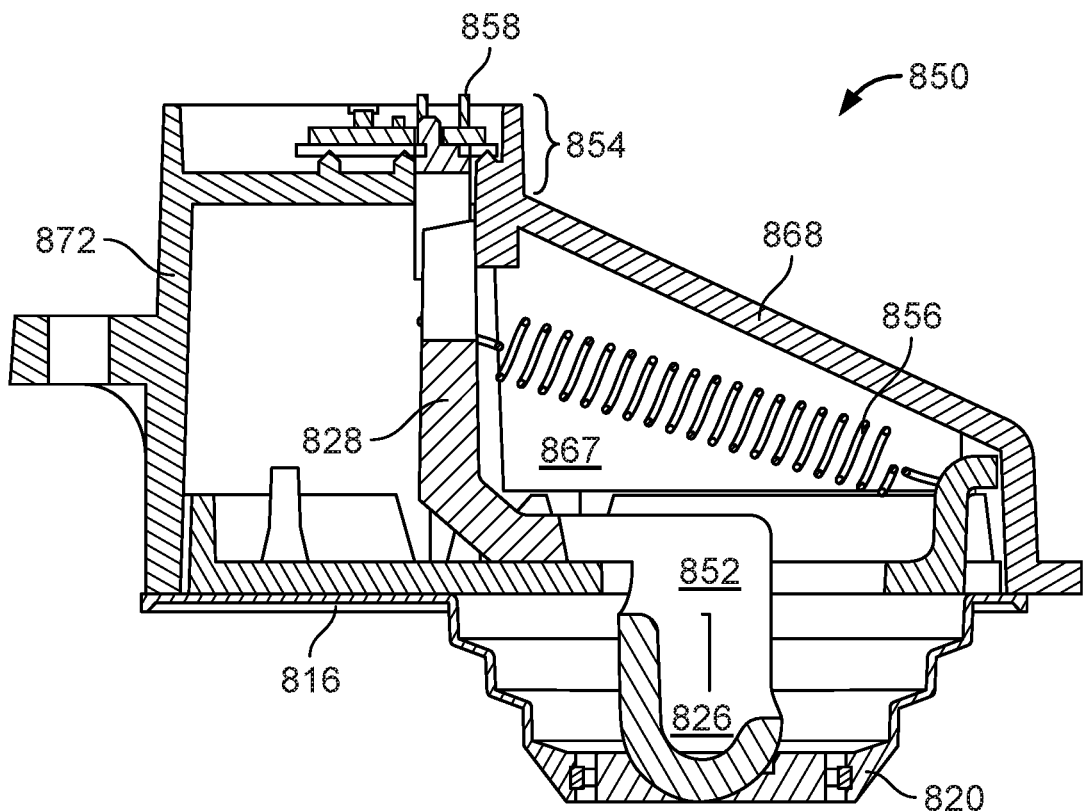
FIGS. 10A and 10B are diagrams of a sensor for an autonomous cleaning robot.

Referring also to FIG. 10A, when the lever 852 is in its extended configuration (e.g., when the autonomous cleaning robot is at a flooring drop), the extension spring 856 exerts a force on the lever that presses the lever against a cleaning pad (not shown) of the autonomous cleaning robot. A head 826 of the lever extends beyond a bottom surface 816 of the autonomous cleaning robot and pushes the flexible pad 820 outwards. A shaft 828 of the lever 852 is positioned substantially vertically, placing the gate element 858 disposed at the top of the lever 852 is positioned in the path of the light beam between the light source and the light detector. As a result, the light detector is blocked from receiving light from the light source when the lever 852 is in its extended configuration.

Figure 10B:
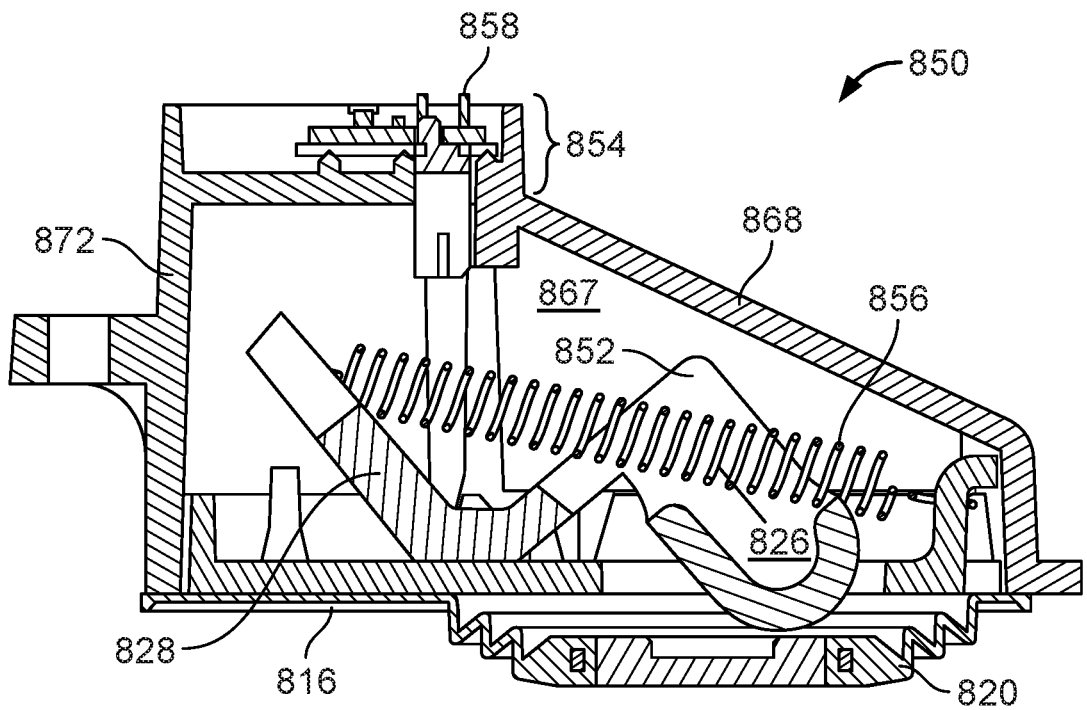

Referring to FIG. 10B, when the autonomous cleaning robot is on a substantially flat floor surface, the floor surface and cleaning pad apply a force to the lever 852 that acts against the force applied by the extension spring 826. This force pushes the flexible pad 820 inwards toward the bottom surface 816 of the autonomous cleaning robot and causes the lever 852 to pivot. The extension spring 826 is stretched into tension. In the retracted configuration, the head 826 of the lever 852 is disposed in an interior space 867 of the housing 868 and the shaft 828 of the lever 852 is angled toward a forward side 872 of the housing 868. With the lever 852 in its retracted configuration, the gate element 858 is positioned out of the path of the light beam between the light source and the light detector, allowing the light detector to receive light from the light source.

In some examples, the spring lever cliff sensor described with respect to FIGS. 8-10 can be used in conjunction with a flap, such as the flap 552 shown in FIGS. 6A and 6B, rather than with the flexible pad 820.

Figure 11A:
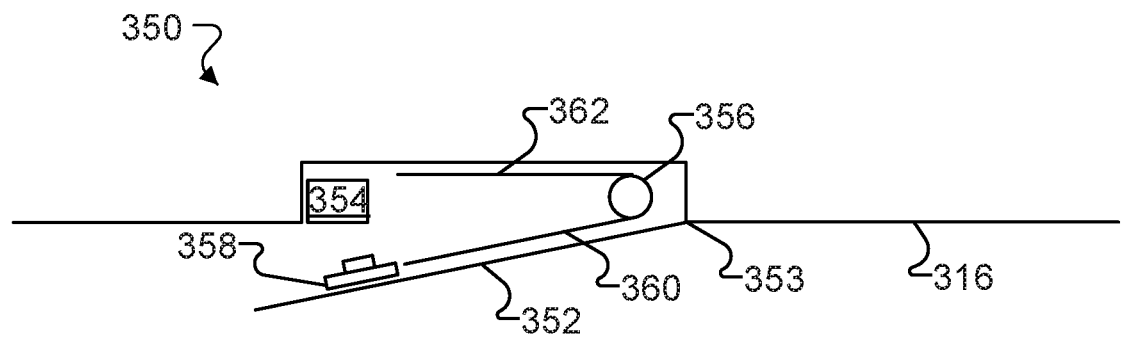
FIGS. 11A and 11B are diagrams of a sensor for an autonomous cleaning robot.
Figure 11B:
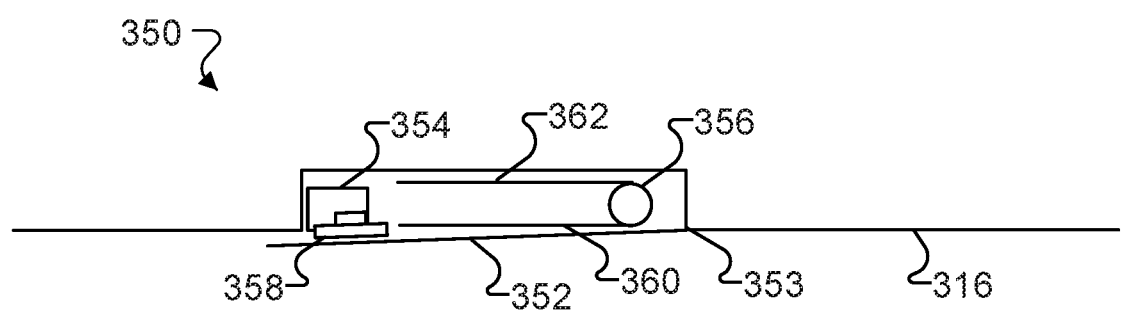

Referring to FIGS. 11A and 11B, a torsion spring cliff sensor 350, e.g., disposed at each forward corner of an autonomous cleaning robot, includes a flap 352 that is configured to pivot about a hinge 353 between an extended configuration (FIG. 11A) and a retracted configuration (FIG. 11B).

The flap 352 is mechanically coupled to a torsion spring 356 that exerts a force that presses the flap 352 open against a cleaning pad (not shown) of the autonomous cleaning robot. A first arm 360 of the torsion spring 356 is attached to the flap 352 and a second arm 362 is fixed to the autonomous cleaning robot. A gate element 358 is disposed on the flap 352.

Referring specifically to FIG. 11A, in the extended configuration, the flap 352 is opened relative to a bottom surface 316 of the autonomous cleaning robot, such that the flap 352 extends beyond the bottom surface 316. With the flap 352 in its extended configuration, the gate element 358 is outside of the light path of an optical gate sensor assembly 354 and the light detector of the optical gate sensor assembly 354 receives light from the light source.

Referring now to FIG. 11B, when the autonomous cleaning robot is on a substantially flat floor surface, the floor surface and cleaning pad apply a force to the flap 352 that acts against the force applied by the torsion spring 356. This force pushes the first arm 360 of the torsion spring 356 upwards toward the second arm 362, closing the torsion spring 356. The force also pushes the flap 352 into its retracted configuration, in which the flap 352 is closed relative to the bottom surface 316 of the autonomous cleaning robot. With the flap 352 in its retracted configuration, the gate element 358 is positioned in the light path of the optical gate sensor assembly 354, preventing the light detector from receiving light from the light source.

In some examples, the torsion spring 356 can be preloaded by a percentage of the weight of the autonomous cleaning robot that is applied to the cleaning pad, such as between 10% and 50% of the robot weight that applied to the cleaning pad or between 1% and 10% of the robot weight, as discussed above with respect to FIG. 3A.

In some examples, cliff sensors can incorporate multiple springs connected in series. For instance, referring to FIGS. 12A and 12B, a multiple spring cliff sensor 450, e.g., disposed at each forward corner of an autonomous cleaning robot, includes a flap 452 that is configured to pivot about a hinge 453 between an extended configuration (FIG. 12A) and a retracted configuration (FIG. 12B).

The flap 452 is mechanically coupled to a torsion spring 456 that exerts a force that presses the flap 452 open against a cleaning pad (not shown) of the autonomous cleaning robot. A first arm 460 of the torsion spring 456 is attached to the flap 452 and a second arm 462 is fixed to the autonomous cleaning robot. The torsion spring 456 is coupled to a leaf spring 470. A first end 422 of the leaf spring 470 is mounted to the autonomous cleaning robot and a second end 424 of the leaf spring 470 is attached to the first arm 460 of the torsion spring 456. An optical gate sensor assembly 454 is positioned along the length of the leaf spring 456, and a gate element 458 is disposed on the leaf spring 456.

Figure 12A:
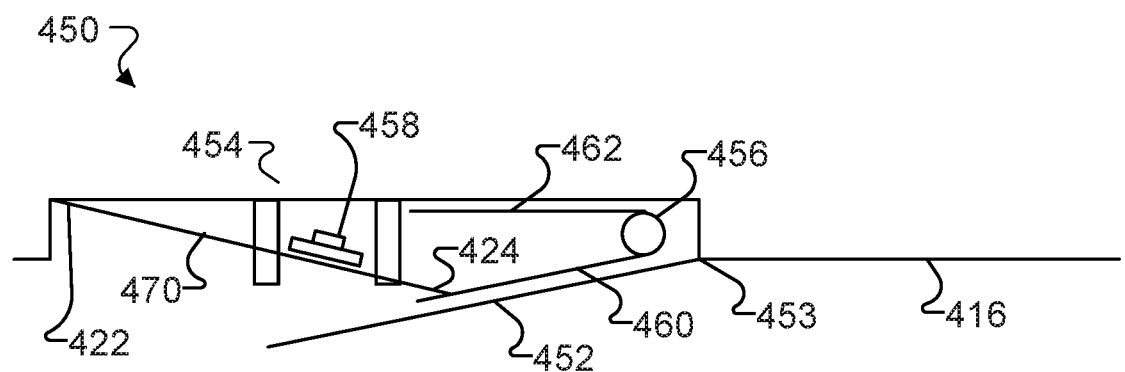
FIGS. 12A and 12B are diagrams of a sensor for an autonomous cleaning robot.
Figure 12B:
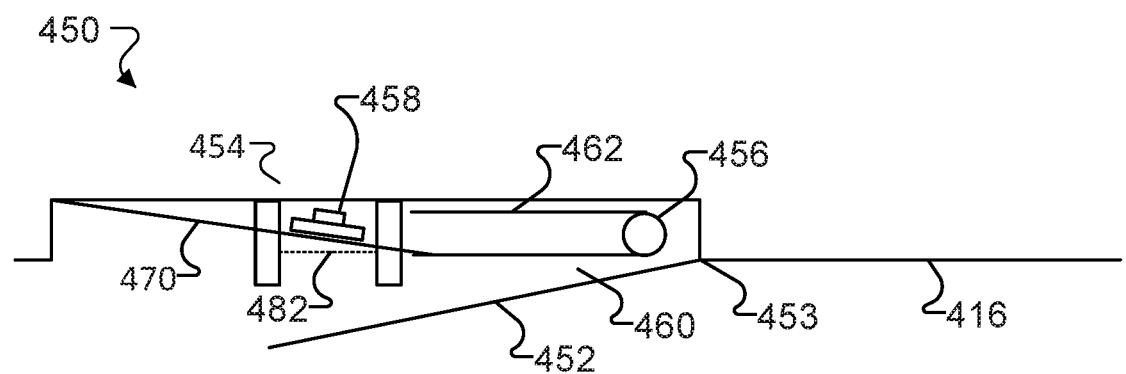

Referring specifically to FIG. 12A, in the extended configuration, the flap 452 is opened relative to a bottom surface 416 of the autonomous cleaning robot, such that the flap 452 extends beyond the bottom surface 416. The torsion spring 456 is open, and the leaf spring 470 is substantially straight.

The gate element is positioned centrally within the optical gate sensor assembly 454, blocking the light path of the optical gate sensor assembly 454, and preventing the light detector of the optical gate sensor assembly 454 from receiving light from the light source.

Referring to FIG. 12B, when the autonomous cleaning robot is on a substantially flat floor surface, the floor surface and cleaning pad apply a force to the flap 452 that acts against the force applied by the torsion spring 456. This force pushes the first arm 460 of the torsion spring 456 upwards toward the second arm 462, closing the torsion spring 462. The force also pushes the flap 452 into its retracted configuration, in which the flap 452 is closed relative to the bottom surface 416 of the autonomous cleaning robot. The closing of the torsion spring 456 exerts a force on the leaf spring 470, bending the leaf spring 470. The leaf spring 470 pushes the gate element 458 toward a top of the optical gate sensor assembly 454 and out of the path of a light beam 482 in the optical gate sensor assembly 454, such that the light detector receives light from the light source.

In some examples, the torsion spring 456 can be preloaded by a percentage of the weight of the autonomous cleaning robot that is applied to the cleaning pad, such as between 10% and 50% of the robot weight that applied to the cleaning pad or between 1% and 10% of the robot weight, as discussed above with respect to FIG. 3A.

Figure 13:
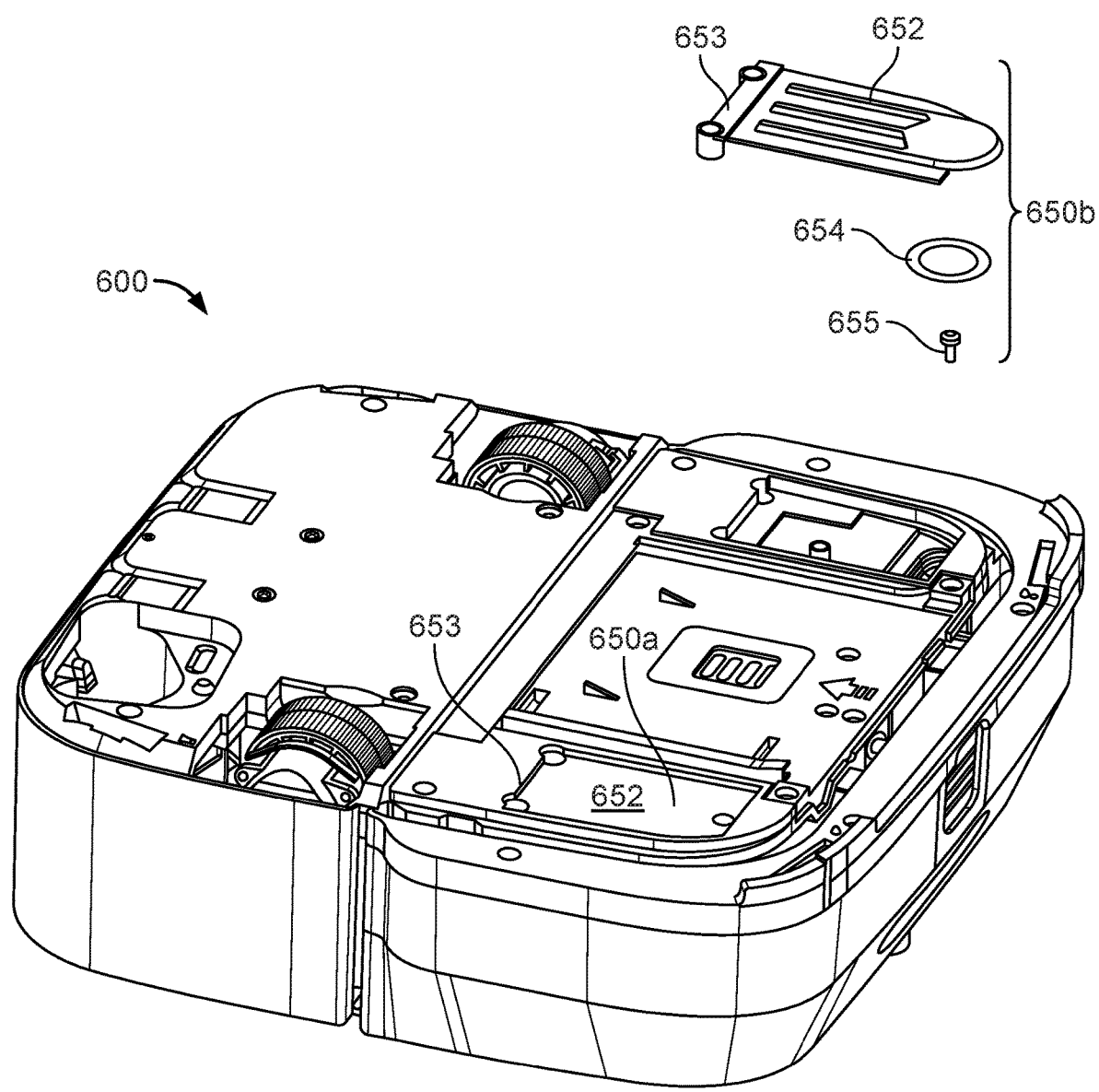
FIG. 13 is a bottom perspective view of an autonomous cleaning robot.

Referring to FIG. 13, a piezoelectric cliff sensor 650 is disposed at each forward corner of an example autonomous cleaning robot 600. In the example of FIG. 13, a first cliff sensor 650a is shown assembled, and a second cliff sensor 650b is shown in an exploded view. Each cliff sensor 650 includes a flap 652 that is configured to pivot about a hinge 653 between an extended configuration (shown in FIG. 14A) and a retracted configuration (shown in FIG. 14B). A piezoelectric sensor 654 disposed on the flap 652 that contacts a striker 655 when the flap is in its retracted configuration, generating a piezoelectric signal.

Figure 14A:
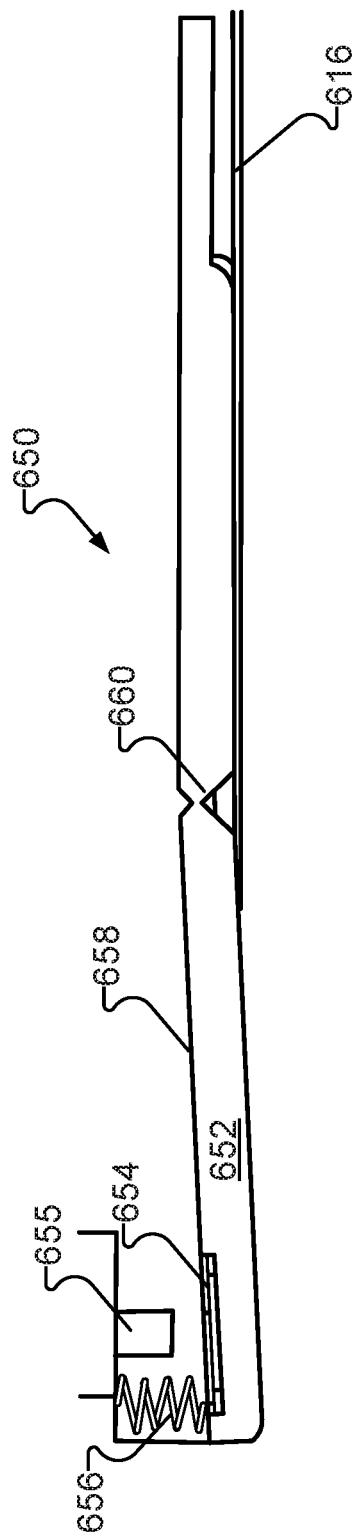
FIGS. 14A and 14B are diagrams of a sensor for an autonomous cleaning robot.

FIG. 14A shows the cliff sensor 650 with the flap 652 in its extended configuration. The flap 652 is mechanically coupled to an extension spring 656 that exerts a force that presses the flap 652 against a cleaning pad (not shown) of the autonomous cleaning robot. In its extended configuration, the flap 652 is open relative to a bottom surface 616 of the autonomous cleaning robot. The piezoelectric sensor 654 is disposed on an interior surface 658 of the flap 652. When the flap 652 is in its extended configuration, the piezoelectric sensor 654 does not contact the striker 655, and no signal is generated by the piezoelectric sensor 654.

Figure 14B:
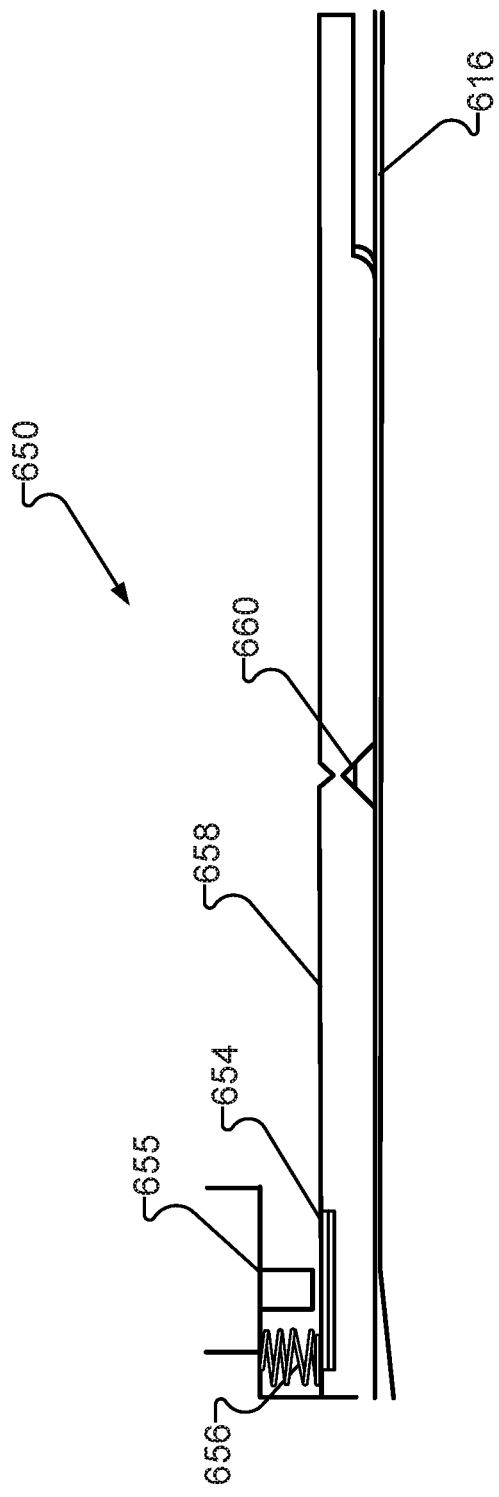

Referring to FIG. 14B, when the autonomous cleaning robot is on a substantially flat floor surface, the floor surface and cleaning pad apply a force to the flap 652 that acts against the force applied by the extension spring 656. This force pushes the flap 652 into its retracted configuration, in which the flap is closed, e.g., more closed than it is in the extended configuration. When the flap 652 is in its retracted configuration, the piezoelectric sensor 654 is brought into contact with the striker 655, and a signal is generated by the piezoelectric sensor 654.

The motion of the door 652 between its extended configuration and its retracted configuration can involve a pivoting motion around a hinge 660, e.g., to provide stability to the door and to reduce piezoelectric noise that could arise from an unstable door.

Piezoelectric sensors can also be employed with other types of cliff sensors, such as leaf spring cliff sensors, spring lever cliff sensors, torsion spring cliff sensors, multiple spring cliff sensors, or other types of cliff sensors.

In the foregoing examples, the cliff sensors are positioned on the bottom surface of the autonomous cleaning robot such that the cleaning pad is disposed between the cliff sensors and the floor surface. In some examples, the cliff sensors can be positioned forward of the cleaning pad. In some examples, cleaning pads with holes aligned with the cliff sensors can be used. When there is no cleaning pad disposed between the cliff sensors and the floor surface, the actuators can react more quickly when the autonomous cleaning robot navigates to a flooring drop.

In some examples, the autonomous cleaning robot can be weighted with ballast at its forward portion to enhance the force imparted by the floor surface and cleaning pad on the movable element. The use of ballast can enable an actuator with a higher spring constant to be used, e.g., which can enable faster response when the autonomous cleaning robot navigates to a flooring drop.

Figure 15:
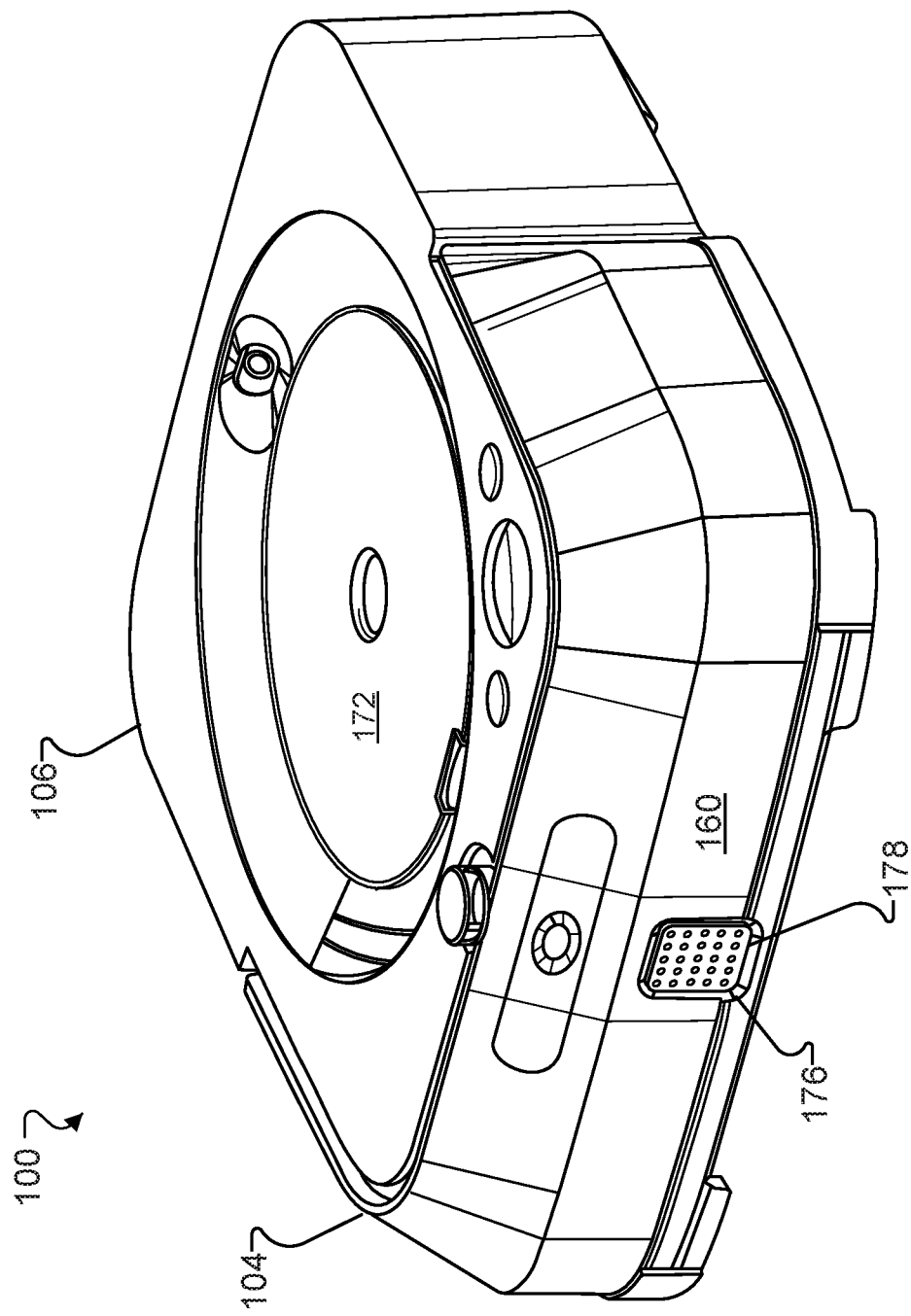
FIG. 15 is a diagram of an autonomous cleaning robot.

Referring to FIG. 15, an autonomous cleaning robot (e.g., the autonomous cleaning robot 100) includes a drive (not shown) that can maneuver the autonomous cleaning robot 100 across the floor surface based on, for example, a drive command having x, y, and θ components.

The forward portion 104 of the autonomous cleaning robot 100 carries a movable bumper 160 for detecting collisions in longitudinal (e.g., forward or rear) or lateral (e.g., left or right) directions.

In some examples, the cleaning pad (not shown) can extend beyond the width of the bumper 160 such that the autonomous cleaning robot 100 can position an outer edge of the cleaning pad up to and along tough-to-reach surfaces or into crevices, such as at a wall-floor interface. In some examples, the cleaning pad extends up to the edges and does not extend beyond a pad holder (not shown) of the robot. In such examples, the cleaning pad can be bluntly cut on the ends and absorbent on the side surfaces. The autonomous cleaning robot 100 can push the edge of the cleaning pad against wall surfaces. The position of the cleaning pad further allows the cleaning pad to clean the surfaces or crevices of a wall by the extended edge of the cleaning pad while the autonomous cleaning robot 100 moves in a wall following motion. The extension of the cleaning pad thus enables the autonomous cleaning robot 100 to clean in cracks and crevices.

A reservoir 172 holds a cleaning fluid (e.g., cleaning solution, water, and/or detergent). The autonomous cleaning robot 100 has a fluid applicator 176 connected to the reservoir 172 by a tube. The fluid applicator 176 can be a sprayer or spraying mechanism including one or more nozzles 178. In some examples of the fluid applicator 176, multiple nozzles are configured to spray fluid in different directions. The fluid applicator may apply fluid downward through a bottom portion of the bumper 160 rather than outward, dripping or spraying the cleaning fluid directly in front of the autonomous cleaning robot 100. In some examples, the fluid applicator is a microfiber cloth or strip, a fluid dispersion brush, or a sprayer. In some examples, the autonomous cleaning robot 100 includes a single nozzle.

The cleaning pad and autonomous cleaning robot 100 are sized and shaped such that the process of transferring the cleaning fluid from the reservoir 172 to the absorptive cleaning pad maintains the forward and aft balance of the autonomous cleaning robot 100 during dynamic motion. The fluid is distributed so that the autonomous cleaning robot 100 continually propels the cleaning pad over the floor surface without the increasingly saturated cleaning pad and decreasingly occupied fluid reservoir 172 lifting the rear portion 106 of the autonomous cleaning robot 100 and pitching the forward portion 104 of the autonomous cleaning robot 100 downward, which can apply movement-prohibitive downward force to the autonomous cleaning robot 100. Thus, the autonomous cleaning robot 100 is able to move the cleaning pad across the floor surface even when the cleaning pad is fully saturated with fluid and the reservoir is empty. The autonomous cleaning robot 100 can track the amount of floor surface travelled and/or the amount of fluid remaining in the reservoir 172, and provide an audible and/or visible alert to a user to replace the cleaning pad and/or to refill the reservoir 172. In some implementations, the autonomous cleaning robot 100 stops moving and remains in place on the floor surface if the cleaning pad is fully saturated or otherwise needs to be replaced, if there remains floor to be cleaned.

The robots and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

Operations associated with implementing all or part of the robot operation and control described herein can be performed by one or more programmable processors executing one or more computer programs to perform the functions described herein. For example, the mobile device, a cloud computing system configured to communicate with the mobile device and the autonomous cleaning robot, and the robot's controller may all include processors programmed with computer programs for executing functions such as transmitting signals, computing estimates, or interpreting signals. A computer program can be written in any form of programming language, including compiled or interpreted languages, and it can be deployed in any form, including as a stand-alone program or as a module, component, subroutine, or other unit suitable for use in a computing environment.

The controllers and mobile devices described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

The robot control and operating techniques described herein may be applicable to controlling other mobile robots aside from cleaning robots. For example, a lawn mowing robot or a space-monitoring robot may be trained to perform operations in specific portions of a lawn or space as described herein.

Elements of different implementations described herein may be combined to form other implementations not specifically set forth above. Elements may be left out of the structures described herein without adversely affecting their operation. Furthermore, various separate elements may be combined into one or more individual elements to perform the functions described herein.

What is claimed is:

1. An autonomous cleaning robot comprising:
   a drive to maneuver the autonomous cleaning robot across a floor surface;
   a cleaning assembly for cleaning the floor surface; and
   a sensor system disposed at a forward portion of the autonomous cleaning robot, the sensor system comprising:
   a movable element that presses against a cleaning pad of the cleaning assembly as the movable element extends beyond a bottom surface of the autonomous cleaning robot, the movable element having (i) a first configuration in which the movable element extends beyond the bottom surface of the autonomous cleaning robot by a first amount, and (ii) a second configuration in which the movable element extends beyond the bottom surface of the autonomous cleaning robot by a second amount less than the first amount;
   a spring mechanically coupled to the movable element, the spring being biased to hold the movable element in the first configuration; and
   a sensor assembly configured to generate a signal based on the configuration of the movable element.

2. The autonomous cleaning robot of claim 1, in which the movable element is configured to be in the second configuration when the autonomous cleaning robot is disposed on a flat floor surface.

3. The autonomous cleaning robot of claim 1, in which the movable element is configured to be in the first configuration when the forward portion of the autonomous cleaning robot is at a flooring drop.

4. The autonomous cleaning robot of claim 1, in which the sensor assembly is configured to generate a signal when the movable element is in the first configuration.

5. The autonomous cleaning robot of claim 1, in which the sensor assembly comprises an optical gate sensor assembly.

6. The autonomous cleaning robot of claim 5, in which the optical gate sensor assembly comprises:
   a light source;
   a light detector positioned to receive light from the light source; and
   a gate element mechanically coupled to the movable element of the sensor system, the gate element being movable into a path between the light source and the light detector.

7. The autonomous cleaning robot of claim 6, in which when the movable element is in the first configuration, the gate element is positioned in the path between the light source and the light detector.

8. The autonomous cleaning robot of claim 1, in which the sensor assembly comprises a piezoelectric sensor assembly.

9. The autonomous cleaning robot of claim 1, in which the movable element comprises a plunger configured to move between the first configuration and the second configuration in a direction perpendicular to the bottom surface of the autonomous cleaning robot.

10. The autonomous cleaning robot of claim 1, in which the movable element comprises a lever configured to pivot between the first configuration to the second configuration.

11. The autonomous cleaning robot of claim 1, in which the movable element comprises a flap connected to the bottom surface of the autonomous cleaning robot by a hinge.

12. The autonomous cleaning robot of claim 1, in which the spring comprises a leaf spring.

13. The autonomous cleaning robot of claim 1, in which the spring comprises an extension spring.

14. The autonomous cleaning robot of claim 1, in which the spring comprises a torsion spring.

15. The autonomous cleaning robot of claim 1, comprising multiple springs connected in series, the multiple springs being mechanically coupled to the movable element.

16. The autonomous cleaning robot of claim 1, further comprising a control unit configured to control operation of the autonomous cleaning robot.

17. The autonomous cleaning robot of claim 16, in which the control unit is configured to receive the signal from the sensor and to stop operation of the autonomous cleaning robot responsive to receiving the signal.

18. The autonomous cleaning robot of claim 1, in which the movable element is configured to move from the second configuration to the first configuration responsive to a change in the floor surface in a vicinity of the movable element.

19. The autonomous cleaning robot of claim 1, in which the cleaning assembly comprises a cleaning pad holder.

20. A method comprising:
controlling an autonomous cleaning robot to execute a cleaning mission;
detecting a change in a configuration of a sensor system disposed at a forward portion of the autonomous cleaning robot, including:
generating a signal based on a configuration of a movable element coupled to a spring, the movable element pressing against a cleaning pad of the autonomous cleaning robot as the movable element extends beyond a bottom surface of the autonomous cleaning robot, and the movable element having (i) a first configuration in which the movable element extends beyond the bottom surface of the robot body by a first amount, and (ii) a second configuration in which the movable element extends beyond the bottom surface of the robot body by a second amount less than the first amount, the spring being biased to hold the movable element in the first configuration; and
stopping execution of the cleaning mission by the autonomous cleaning robot responsive to detecting the change in configuration of the sensor system.

21. The method of claim 20, in which detecting a change in a configuration of a sensor system comprises detecting that the movable element is in the first configuration.

22. The method of claim 20, in which the movable element is configured to be in the second configuration when the autonomous cleaning robot is disposed on a flat floor surface.

23. The method of claim 20, in which the movable element is configured to be in the first configuration when the forward portion of the autonomous cleaning robot is at a flooring drop.

24. The method of claim 20, in which generating a signal based on the configuration of the movable element comprises generating the signal when the movable element is in the first configuration.

25. The method of claim 20, in which generating a signal based on the configuration of the movable element comprises detecting when a gate element mechanically coupled to the movable element of the sensor system is positioned in a path between a light source of an optical gate sensor assembly and a light detector of the optical gate sensor assembly.

26. The method of claim 20, in which generating a signal based on the configuration of the movable element comprises generating a signal based on a change in a configuration of a plunger configured to move between the first configuration and the second configuration in a direction perpendicular to the bottom surface of the autonomous cleaning robot.

27. The method of claim 20, in which generating a signal based on the configuration of the movable element comprises generating a signal based on a change in a configuration of a lever configured to pivot between the first configuration and the second configuration.

28. The method of claim 20, in which generating a signal based on the configuration of the movable element comprises generating a signal based on a change in a configuration of a flap connected to the bottom surface of the autonomous cleaning robot by a hinge.

* * * * *